United States Patent
Maul et al.

(10) Patent No.: US 12,214,739 B2
(45) Date of Patent: Feb. 4, 2025

(54) COMPONENT FOR VEHICLE INTERIOR

(71) Applicant: Yanfeng Automotive Safety Systems Co. Ltd, Novi, MI (US)

(72) Inventors: Holger Maul, Rüsselsheim (DE); Juergen Zachert, Cologne (DE); Samir Heric, Wiesbaden (DE)

(73) Assignee: Yanfeng Automotive Safety Systems Co. LTD, Novi, MI (US)

( * ) Notice: Subject to any disclaimer, the term of this patent is extended or adjusted under 35 U.S.C. 154(b) by 0 days.

(21) Appl. No.: 18/240,593

(22) Filed: Aug. 31, 2023

(65) Prior Publication Data

US 2024/0034263 A1 Feb. 1, 2024

Related U.S. Application Data

(63) Continuation-in-part of application No. PCT/US2022/018206, filed on Feb. 28, 2022.
(Continued)

(51) Int. Cl.
| | | |
|---|---|---|
| *B60R 21/205* | (2011.01) | |
| *B60R 21/215* | (2011.01) | |
| *B60R 21/26* | (2011.01) | |

(52) U.S. Cl.
CPC .......... *B60R 21/205* (2013.01); *B60R 21/215* (2013.01); *B60R 21/26* (2013.01); *B60R 2021/21512* (2013.01)

(58) Field of Classification Search
CPC ..... B60R 21/205; B60R 21/215; B60R 21/26; B60R 2021/21512
(Continued)

(56) References Cited

U.S. PATENT DOCUMENTS

| | | |
|---|---|---|
| 4,988,119 A | 1/1991 | Hartmeyer |
| 5,087,071 A | 2/1992 | Wallner et al. |
| (Continued) | | |

FOREIGN PATENT DOCUMENTS

| | | | |
|---|---|---|---|
| CA | 2 392 291 A1 | 6/2001 | |
| CA | 2 440 081 A1 | 9/2002 | |
| (Continued) | | | |

OTHER PUBLICATIONS

International Search Report and Written Opinion received for International PCT Application Serial No. PCT/US22/18206 dated May 23, 2022, 15 pages.
(Continued)

*Primary Examiner* — Toan C To
(74) *Attorney, Agent, or Firm* — Amin, Turocy & Watson, LLP

(57) ABSTRACT

A component for a vehicle interior may comprise a panel comprising a structure, and an airbag comprising a cushion for deployment through the panel. The airbag may be directly attached to the structure. The airbag may comprise a set of holes for attachment to the structure. The structure may comprise a set of posts for the set of holes. The structure may comprise an airbag chute. The component may comprise a cover coupled to the structure and an inflator coupled to the cover. The cover may clamp the airbag between the cover and the structure. The airbag may comprise at least one flap coupled between the cover and the structure. The cover may be staked to the structure. The structure may comprise a frame for attachment of the airbag and the cover to the structure. The component may comprise a trim component, instrument panel or door panel.

20 Claims, 22 Drawing Sheets

Related U.S. Application Data

(60) Provisional application No. 63/208,832, filed on Jun. 9, 2021, provisional application No. 63/155,059, filed on Mar. 1, 2021.

(58) Field of Classification Search
USPC .................................................. 280/731, 732
See application file for complete search history.

(56) References Cited

U.S. PATENT DOCUMENTS

| | | | |
|---|---|---|---|
| 5,393,090 A * | 2/1995 | Shepherd | B60R 21/2171 280/743.1 |
| 5,470,099 A * | 11/1995 | Williams | B60R 21/203 74/552 |
| 5,560,642 A | 10/1996 | Davidson et al. | |
| 5,580,081 A | 12/1996 | Berg et al. | |
| 5,711,545 A | 1/1998 | Wehner | |
| 5,716,068 A * | 2/1998 | Sahara | B60Q 5/003 280/728.2 |
| 5,765,860 A * | 6/1998 | Osborn | B60R 21/21658 200/61.54 |
| 6,042,147 A * | 3/2000 | Nishijima | B60R 21/217 280/743.1 |
| 6,161,865 A * | 12/2000 | Rose | B60R 21/2171 280/732 |
| 6,612,607 B1 | 9/2003 | Takahashi | |
| 6,886,854 B2 | 5/2005 | Weiss et al. | |
| 7,144,034 B2 * | 12/2006 | Nash | B60R 21/2037 280/728.2 |
| 7,222,876 B2 | 5/2007 | Riesinger et al. | |
| 7,234,724 B1 | 6/2007 | COWelchuk et al. | |
| 7,458,604 B2 | 12/2008 | Hier et al. | |
| 7,686,326 B2 * | 3/2010 | Kim | B60R 21/205 280/732 |
| 8,136,832 B2 | 3/2012 | Rick et al. | |
| 8,469,393 B1 * | 6/2013 | Siewert | B29C 44/351 280/728.3 |
| 8,752,859 B2 | 6/2014 | Morawietz et al. | |
| 8,894,092 B2 | 11/2014 | Hayashi et al. | |
| 10,093,267 B2 | 10/2018 | Kong | |
| 10,457,244 B2 * | 10/2019 | Yamada | B60R 21/205 |
| 10,486,634 B2 | 11/2019 | Schmid | |
| 10,829,074 B2 | 11/2020 | Jacobson | |
| 2002/0020996 A1 | 2/2002 | Eckert et al. | |
| 2002/0149177 A1 * | 10/2002 | Rose | B60R 21/217 280/736 |
| 2003/0132621 A1 | 7/2003 | Arieth et al. | |
| 2003/0209888 A1 | 11/2003 | Davis, Jr. et al. | |
| 2004/0130132 A1 | 7/2004 | Soncrant et al. | |
| 2004/0262897 A1 | 12/2004 | Hier et al. | |
| 2005/0035578 A1 | 2/2005 | Arwood | |
| 2006/0022438 A1 | 2/2006 | Beckley et al. | |
| 2006/0082109 A1 | 4/2006 | Hier et al. | |
| 2007/0007752 A1 | 1/2007 | Rose et al. | |
| 2008/0143086 A1 | 6/2008 | Higuchi | |
| 2009/0184495 A1 | 7/2009 | Kim et al. | |
| 2010/0327566 A1 | 12/2010 | Matsushima | |
| 2011/0095512 A1 | 4/2011 | Mendez | |
| 2013/0076010 A1 | 3/2013 | Toshiteru | |
| 2013/0320695 A1 | 12/2013 | Wenzel et al. | |
| 2015/0074969 A1 | 3/2015 | Jindal et al. | |
| 2015/0175118 A1 | 6/2015 | Hattensperger et al. | |
| 2016/0214563 A1 * | 7/2016 | Kunitake | B60R 21/2165 |
| 2016/0280176 A1 | 9/2016 | Yamada | |
| 2017/0267202 A1 | 9/2017 | Kong | |
| 2018/0201218 A1 | 7/2018 | Zhang et al. | |
| 2020/0079312 A1 | 3/2020 | Stroebe et al. | |
| 2022/0371538 A1 * | 11/2022 | Morita | B60R 21/2338 |

FOREIGN PATENT DOCUMENTS

| | | |
|---|---|---|
| DE | 100 23 651 B4 | 8/2008 |
| EP | 0 796 769 A1 | 9/1997 |
| EP | 1 097 063 A1 | 5/2001 |
| EP | 1 106 446 A1 | 6/2001 |
| EP | 1 365 946 A2 | 12/2003 |
| EP | 2517932 B1 | 9/2017 |
| ES | 1 229 419 U | 5/2019 |
| GB | 2 419 320 A | 4/2006 |
| KR | 10-1724964 B1 | 4/2017 |
| WO | 1999/067107 A1 | 12/1999 |
| WO | 2001/042060 A1 | 6/2001 |
| WO | 2002/070308 A3 | 12/2002 |

OTHER PUBLICATIONS

Extended European Search Report received for European Patent Application Serial No. 22763851.7 dated Dec. 2, 2024 pages.

* cited by examiner

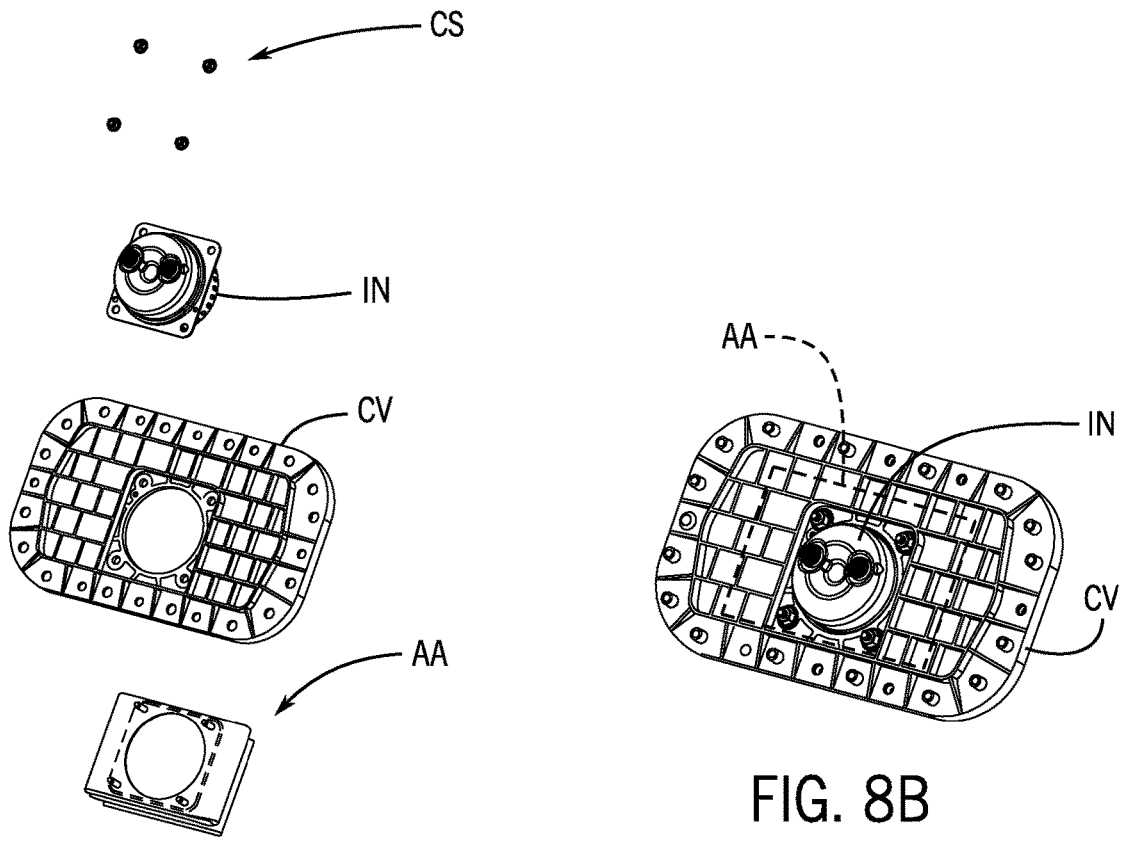
FIG. 8A
FIG. 8B
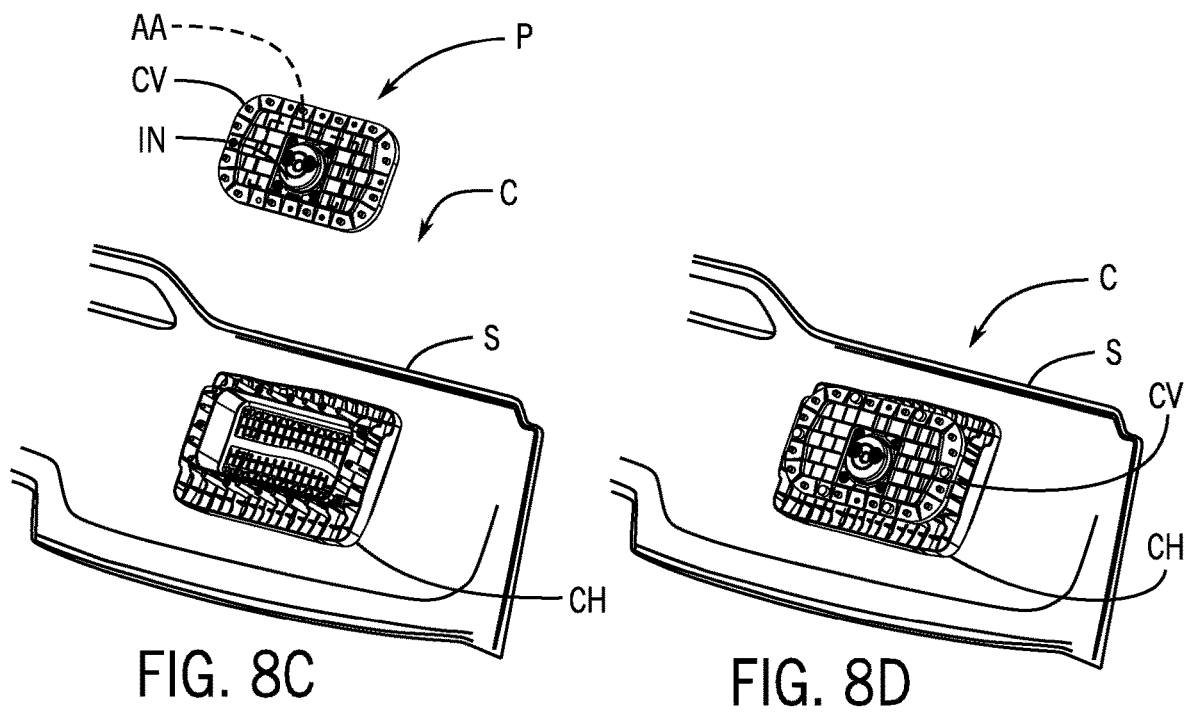
FIG. 8C
FIG. 8D

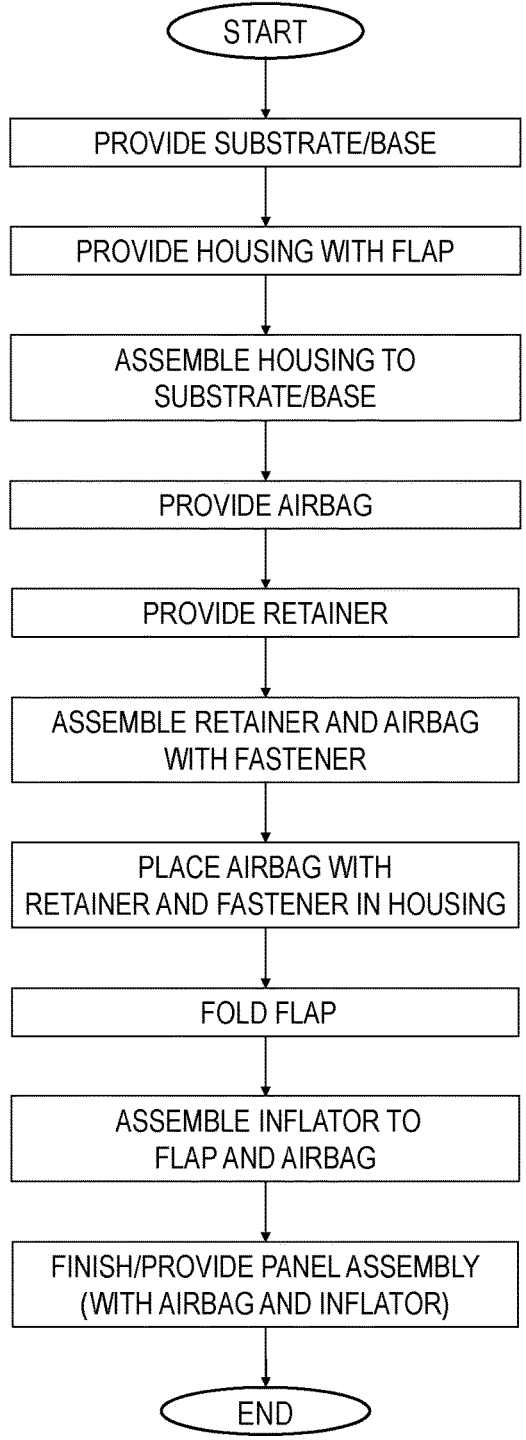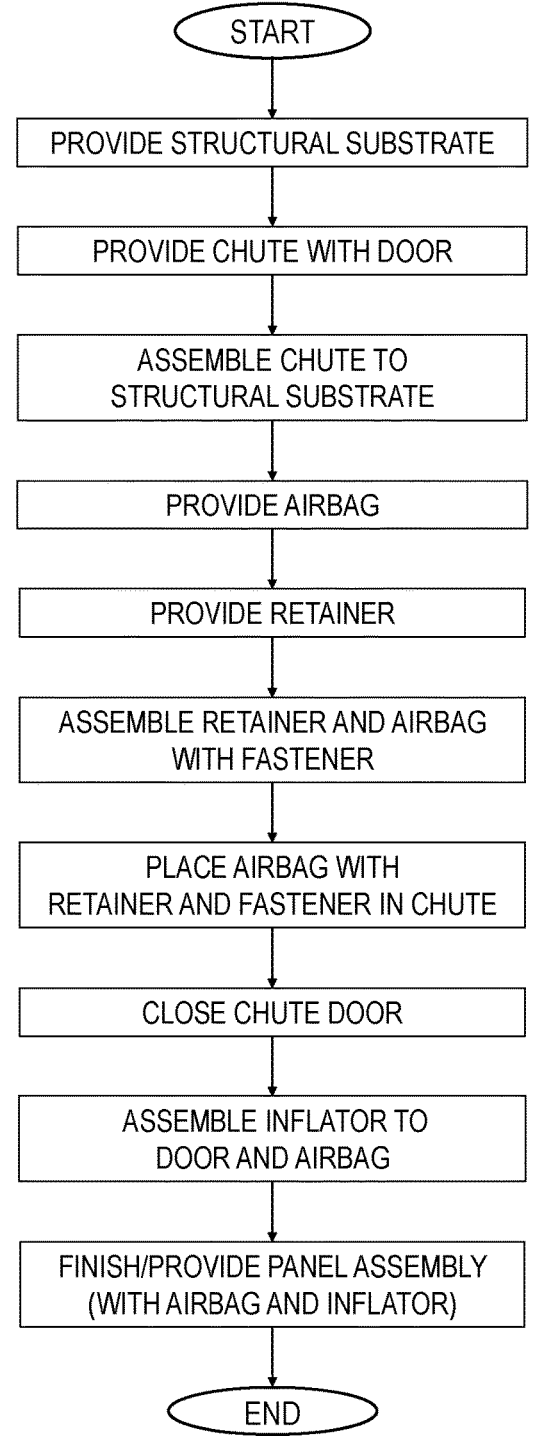
FIG. 20B
FIG. 20C

COMPONENT FOR VEHICLE INTERIOR

CROSS-REFERENCE TO RELATED APPLICATIONS

The present application is a continuation in part of PCT/International Patent Application No. PCT/US2022/18206 titled "COMPONENT FOR VEHICLE INTERIOR" filed Feb. 28, 2022, which claims the benefit of U.S. Provisional Patent Application No. 63/208,832 titled "VEHICLE INTERIOR COMPONENT" filed Jun. 9, 2021 and U.S. Provisional Patent Application No. 63/155,059 titled "VEHICLE INTERIOR COMPONENT" filed Mar. 1, 2021.

The present application claims priority to and incorporates by reference in full the following patent applications: (a) U.S. Provisional Patent Application No. 63/155,059 titled "VEHICLE INTERIOR COMPONENT" filed Mar. 1, 2021; (b) U.S. Provisional Patent Application No. 63/208,832 titled "VEHICLE INTERIOR COMPONENT" filed Jun. 9, 2021; (c) PCT/International Patent Application No. PCT/US2022/18206 titled "COMPONENT FOR VEHICLE INTERIOR" filed Feb. 28, 2022.

FIELD

The present invention relates to a component for a vehicle interior.

The present invention also relates to a component for a vehicle interior such as a panel assembly comprising a housing for an airbag.

The present invention also relates to a method of producing a panel assembly integrated with an airbag.

The panel assembly may comprise a trim panel and/or an instrument panel.

BACKGROUND

It is known to provide a component for a vehicle interior such as an instrument panel configured for installation of an airbag assembly such as an airbag module that is installed into an airbag chute behind the vehicle interior component.

It would be advantageous to provide an improved component such as a panel assembly integrated with an airbag.

It would also be advantageous to provide an improved vehicle interior component with a housing configured for integration/assembly of the airbag.

It would also be advantageous to provide an improved vehicle interior component with a housing configured for integration/assembly of the airbag in an assembly such as a panel assembly comprising a trim panel, instrument panel, etc.

SUMMARY

The present invention relates to a component for a vehicle interior comprising a panel comprising a structure, and an airbag comprising a cushion configured for deployment through the panel into the vehicle interior. The airbag may be coupled to the structure. The airbag may be configured for direct attachment to the structure. The airbag may comprise a base section comprising a set of features configured for attachment of the airbag to the structure; the set of features may comprise a set of holes. The airbag may comprise a set of flaps; the set of flaps may comprise the set of holes. The structure may comprise an airbag chute. The structure may comprise a set of features configured for attachment of the airbag to the structure. The set of features of the structure may comprise a set of posts; the airbag may comprise a set of holes for attachment of the airbag to the structure. The set of features of the structure may comprise a set of posts; the airbag may comprise a flap comprising a set of holes configured to engage the set of posts of the structure. The component may comprise a cover coupled to the structure; the structure may be configured to provide a compartment for the airbag; the airbag may be configured for deployment from the compartment through the panel into the vehicle interior. The component may comprise an inflator configured to inflate the cushion of the airbag for deployment into the vehicle interior; the inflator may be coupled to the cover. The cover may comprise a molded cover plate. The cover may be configured to clamp the airbag between the cover and the structure. The airbag may comprise at least one flap coupled between the cover and the structure. The component may comprise an inflator configured to inflate the airbag; the inflator may be assembled to the cover. The cover may comprise a set of features configured for attachment of the cover to the structure; the set of features of the cover may comprise a set of holes configured to engage a set of posts of the structure. The cover may be staked to the structure. The structure may comprise a frame configured for attachment of the airbag to the structure and attachment of a cover to the structure. The component may comprise at least one of (a) a trim component; (b) an instrument panel; (c) a door panel.

The present invention relates to a component for a vehicle interior configured for deployment of an airbag into the vehicle interior produced by a process comprising the steps of providing a panel assembly comprising a structural substrate and an airbag chute configured to facilitate deployment of the airbag, providing the airbag within the airbag chute, and assembling a cover plate to the panel assembly with the airbag. The cover plate and the panel assembly may be configured to provide a compartment for the airbag. The step of providing the airbag within the airbag chute may comprise coupling at least one flap of the airbag between the cover plate and the airbag chute. The step of assembling a cover plate to the panel assembly with the airbag may comprise staking the cover plate to the airbag chute to clamp the airbag between the cover plate and the airbag chute.

The present invention relates to a component for a vehicle interior comprising a panel comprising a structure, and an airbag comprising a cushion configured for deployment through the panel into the vehicle interior. The airbag may be coupled to the structure. The airbag may be configured for attachment to the structure. The airbag may be configured for direct attachment to the structure. The airbag may comprise a base section comprising a set of features configured for attachment of the airbag to the structure. The set of features may comprise a set of holes. The airbag may comprise a set of flaps; the set of flaps may comprise the set of features. The structure may comprise an airbag chute. The structure may comprise a cover. The structure may comprise a composite structure comprising an airbag chute and a cover. The structure may comprise a set of features configured for attachment of the airbag to the structure. The set of features of the structure may comprise at least one of (a) a set of holes and (b) a set of posts. The set of features of the structure may comprise a set of posts; the set of features of the airbag may comprise a set of holes. The set of features of the structure may comprise a set of posts; the set of features of the airbag may comprise a set of flaps comprising a set of holes for the set of posts of the structure. The set of features of the structure may comprise a set of posts; the set of features of the airbag may comprise a set of flaps comprising a set of holes configured to engage the set of posts of the structure. The structure may be configured to provide a compartment for the airbag; the airbag may be configured for deployment from the compartment through the panel into the vehicle interior. The component may comprise a cover for the structure. The component may comprise a cover for the compartment. The cover may be coupled to the structure. The airbag may be directly coupled to the structure. The airbag may be coupled to the cover. The cover may comprise a set of features configured for attachment of the cover to the structure. The set of features of the cover may comprise a set of holes. The set of features of the structure may comprise a set of posts; the set of features of the cover may comprise a set of holes. The set of features of the structure may comprise a set of posts; the set of features of the cover may comprise a set of holes configured to engage the set of posts of the structure. The component may comprise an inflator configured to inflate the cushion of the airbag for deployment into the vehicle interior. The inflator may be coupled to the structure. The inflator may be configured to be attached to the structure. The component may comprise a cover for the structure; the inflator may be coupled to the cover. The cover may comprise a set of features configured for attachment of the inflator to the cover. The inflator may comprise a set of features configured for attachment of the inflator to the cover. The set of features of the inflator may comprise a set of holes. The inflator may be coupled to the cover with a set of fasteners. The set of features of the inflator may comprise a set of holes for the set of fasteners. The cover may be attached to the structure by staking. The cover may be staked to the structure. The structure may comprise an airbag chute; the airbag may comprise at least one flap coupled to the airbag chute. The structure may comprise a frame configured for attachment of the airbag to the structure. The frame of the structure may be configured for attachment of a cover to the structure. The structure may comprise a frame configured for attachment of a cover to the structure. The cover may comprise an interface configured for attachment of an inflator to the cover; the interface of the cover may comprise a hole to connect the inflator with the airbag. The component may comprise a cover; the cover may comprise a cover plate configured for attachment to the structure. The structure may comprise a housing. The structure may comprise a set of features configured for attachment of the cover plate to the structure. The panel may comprise a substrate. The panel may comprise a structural substrate. The structure may be configured to be attached directly to the panel. The cushion of the airbag may be configured to form an airbag door in the panel when inflated from the compartment for deployment through the panel into the vehicle interior. The component may comprise a panel assembly comprising the panel and the structure. The panel may comprise a structural substrate; the structure may comprise an airbag chute. The component may comprise a cover coupled to the panel assembly; the cover and the panel assembly may be configured to provide a compartment for the airbag. The airbag may comprise at least one flap coupled to the airbag chute. The cover may comprise a cover plate. The cover may comprise a molded cover plate. The cover may be staked to the airbag chute. The airbag may be clamped between the cover and the airbag chute. The airbag may be coupled between the cover and the airbag chute. The cover may be configured to clamp the airbag between the cover and the airbag chute. The airbag chute may comprise a post; the at least one flap may comprise a hole coupled to the post. The at least one flap may be coupled between the cover and the airbag chute. The component may comprise an inflator configured to inflate the airbag; the inflator may be assembled to the cover. The cover may be provided between the inflator and the airbag. The cover may be configured to secure the inflator to the panel assembly. The cover may be configured to couple the inflator to the airbag chute. The panel assembly may be configured to provide an airbag door for deployment of the airbag. The component may comprise at least one of (a) a trim component; (b) an instrument panel; (c) a door panel.

The present invention relates to a component for a vehicle interior configured for deployment of an airbag into the vehicle interior comprising a panel comprising a structural substrate, a housing for the airbag coupled to the panel, and a cover configured to retain the airbag and the inflator to the housing. The housing may be configured to provide an airbag chute for deployment of the airbag. The airbag may be configured to be clamped between the cover and the housing. The airbag may comprise at least one flap coupled to the housing. The at least one flap may be coupled between the cover and the housing. The cover may be staked to the housing. The cover may comprise a molded plate. The component may comprise an inflator configured to inflate the airbag; the inflator may be assembled to the cover.

The present invention relates to a component for a vehicle interior configured for deployment of an airbag into the vehicle interior produced by a process comprising the steps of providing a panel assembly comprising a structural substrate and an airbag chute configured to facilitate deployment of the airbag, providing the airbag within the airbag chute, and assembling a cover plate to the panel assembly with the airbag. The cover plate and the panel assembly may be configured to provide a compartment for the airbag. The step of providing the airbag within the airbag chute may comprise coupling at least one flap of the airbag between the cover plate and the airbag chute. The step of assembling a cover plate to the panel assembly with the airbag may comprise staking the cover plate to the airbag chute to clamp the airbag between the cover plate and the airbag chute. The airbag may be enclosed by the cover plate. The process may comprise a step of securing an inflator to the cover plate.

The present invention relates to a component for a vehicle interior comprising a panel, a structure on the panel providing a compartment, an airbag comprising a base section and a cushion configured to be inflated from the compartment for deployment through the panel into the vehicle interior, a cover for the compartment of the structure, and an inflator configured to inflate the cushion of the airbag for deployment into the vehicle interior. The airbag may be configured to be directly attached to the structure. The airbag may comprise a feature configured for attachment of the airbag to the structure; the feature may comprise a set of flanges comprising a set of holes, The present invention relates to a component for a vehicle interior configured for deployment of an airbag into the vehicle interior comprising a panel assembly comprising a substrate panel and an airbag chute, an airbag, an inflator configured to inflate the airbag and a cover assembled to the airbag chute. The panel assembly may be configured to provide an airbag door for deployment of the airbag. The cover may be configured to retain the airbag to the airbag chute. The component may comprise a retainer for the airbag. The retainer may comprise at least one of (a) a frame; (b) a frame retained by a fastener arrangement. The cover may comprise a retainer for the airbag. The cover may comprise a cover plate. The cover may be provided between the inflator and the airbag. The inflator may be assembled to the cover. The airbag may be provided between the cover and the substrate panel. The component may comprise a mount configured to assemble the inflator to the airbag. The mount may comprise a retainer. The cover may be configured to secure the inflator to the panel assembly. The cover may comprise at least one of (a) a cover plate; (b) a cover plate comprising at least one door; (c) a closure; (d) a set of doors; (e) a closure comprising a set of doors; (f) a closure configured to secure the inflator to the airbag. The component may comprise an airbag assembly comprising a retainer and the airbag. The component may comprise a fastener arrangement configured to couple the cover to the panel assembly. The component may comprise a fastener arrangement configured to retain the inflator to the panel assembly by the cover. The fastener arrangement may be configured to couple the inflator to the airbag chute. The cover may comprise a hole pattern configured for a fastener arrangement; the inflator may comprise a hole pattern configured for a fastener arrangement. The component may comprise a fastener arrangement configured to clamp the cover between the inflator and the airbag. The cover may be configured to couple the inflator to the airbag chute. The inflator may be assembled to a retainer. The cover may comprise a cover plate; the substrate panel may comprise a structural substrate. The airbag may be coupled between the cover and the airbag chute. The inflator may be configured to couple the airbag and the cover. The cover may be configured to couple the airbag and the inflator to the panel assembly. The cover may be coupled between the airbag and the inflator. The panel assembly may be configured for (a) an open state with the airbag chute accessible for assembly of the airbag and (b) a closed state with the airbag and the inflator coupled to the panel assembly by the cover. The cover and the panel assembly are configured to provide a compartment for the airbag. The inflator may be configured to extend through the cover into the compartment. The inflator may be configured to extend through an opening in the cover (a) in a first direction toward the panel substrate and (b) in a second direction away from the panel substrate. The component may comprise a fastener; the cover may comprise a hole; the inflator may comprise a hole; the fastener may be configured to extend through the hole of the inflator; the fastener may be configured to extend through the hole of the cover. The fastener may be configured to couple the cover and the inflator and the airbag. The component may comprise at least one of (a) a trim component; (b) an instrument panel; (c) a door panel.

The present invention relates to an instrument panel assembly configured to provide an airbag configured to be inflated by an inflator for deployment into a vehicle interior comprising a panel comprising a substrate, a housing for the airbag coupled to the substrate of the panel, and a cover configured to retain the airbag and the inflator to the housing. The housing may be configured to provide an airbag chute for deployment of the airbag. The cover may be configured to be attached to the housing for assembly of the airbag to the housing. The airbag may be assembled to the housing by attachment of the cover to the housing. The cover may be configured to support the airbag. The cover may comprise a cover plate; the airbag may be enclosed by the cover plate. The airbag may be assembled by attachment of the cover plate to the airbag chute. The instrument panel assembly may comprise an airbag assembly comprising the airbag; the airbag assembly may be configured to be assembled to the housing by the cover. The airbag may be coupled between the cover and the airbag chute. The inflator may be configured to be coupled to the cover.

The present invention relates to a component for a vehicle interior configured for deployment of an airbag into the vehicle interior comprising a panel assembly comprising a substrate panel and an airbag chute, an airbag, an inflator configured to inflate the airbag, and a retainer assembled to the airbag. The panel assembly may be configured to provide an airbag door for deployment of the airbag. The retainer may be configured to retain the airbag to the airbag chute. The component may comprise a cover for the airbag chute. The cover may comprise a cover plate assembled to the airbag chute. The cover may be provided between the inflator and the airbag. The inflator may be assembled to the retainer. The component may comprise a mount configured for the retainer; the mount may be configured for assembly of the inflator to the airbag. The retainer may be configured to secure the inflator to the panel assembly. The retainer may comprise at least one of (a) a frame; (b) a frame retained by a fastener arrangement. The component may comprise an airbag assembly comprising the retainer and the airbag. The component may comprise a fastener arrangement configured to couple the retainer to the panel assembly. The fastener arrangement may be configured to retain the inflator to the panel assembly by the retainer. The fastener arrangement may be configured to couple the inflator to the airbag chute. The airbag may comprise a hole pattern configured for the fastener arrangement; the retainer may comprise a hole pattern configured for the fastener arrangement; the inflator may comprise a hole pattern configured for the fastener arrangement. The fastener arrangement may be configured to clamp the retainer between the inflator and the airbag. The retainer may be configured to couple the airbag to the airbag chute. The inflator may be assembled to the retainer. The panel assembly may be configured for (a) an open state with the airbag chute accessible for assembly of the airbag and (b) a closed state with the airbag coupled to the panel assembly.

The present invention relates to a method of producing an instrument panel assembly configured for attachment of an airbag actuated by an inflator comprising the steps of forming a substrate panel, providing a housing on the substrate panel, providing the airbag within the housing, and providing a cover to retain the airbag within the housing. The housing may comprise an airbag chute configured to facilitate deployment of the airbag through the substrate panel so that the instrument panel assembly may comprise the substrate panel with the housing comprising the airbag chute with the airbag configured for deployment. The step of providing the airbag within the housing may comprise assembling the airbag with the inflator to the housing to be secured by the cover. The airbag may be attached to the housing by the cover. The airbag may be enclosed in the housing by the cover. The cover may comprise a cover plate; the airbag may be assembled by attachment of the inflator to the cover plate. The airbag may be assembled by attachment of the cover and the inflator. The cover may be configured to attach the inflator to the housing. The cover may be configured to attach the inflator to the airbag component. The step of providing a cover to retain the airbag within the housing may comprise securing the cover with a fastener arrangement; the fastener arrangement may comprise a set of fasteners configured for attachment to a set of posts. The cover may comprise a set of apertures for attachment to the airbag chute; the set of posts may be configured for attachment of an inflator for the airbag. The cover may be configured for a set of posts configured for attachment of the airbag to the housing. The set of posts may be configured for coupling an inflator to the airbag. The method may comprise the step of providing an airbag assembly comprising a retainer and the airbag; the airbag assembly may comprise a set of fasteners configured for attachment of the airbag by the retainer. The method may comprise the step of providing a fastener arrangement configured to couple the cover to the panel assembly. The cover may comprise a hole pattern configured for the fastener arrangement; the inflator may comprise a hole pattern configured for the fastener arrangement.

The present invention relates to a component for a vehicle interior configured for deployment of an airbag into the vehicle interior comprising a panel assembly and an airbag. The panel assembly may comprise an airbag chute coupled to a structural substrate. The panel assembly may be configured for (a) an open state with the airbag chute accessible for assembly of the airbag and (b) a closed state with the airbag coupled to the panel assembly. The airbag chute may comprise a door configured to support the airbag; the door may be configured for (a) an open position in the open state of the panel assembly; (b) a closed position in the closed state of the panel assembly The door may be configured to position the airbag between the door and the structural substrate. The structural substrate may comprise a door configured to open to facilitate deployment of the airbag; the door of the airbag chute may be configured to remain in a closed position during deployment of the airbag.

The present invention relates to an instrument panel assembly comprising an airbag configured to be actuated by an inflator, an instrument panel comprising a substrate, and a housing for the airbag coupled to the substrate of the instrument panel. The housing may comprise a chute for the airbag and a flap. The flap of the housing may be configured to be folded for attachment of the airbag to the housing so that the airbag may be attached to the housing at the flap. The airbag may be attached to the housing by the flap.

The present invention relates to a component for a vehicle interior configured for deployment of an airbag into the vehicle interior comprising a panel assembly and an airbag. The panel assembly may comprise an airbag chute coupled to a structural substrate. The panel assembly may be configured for (a) an open state with the airbag chute accessible for assembly of the airbag and (b) a closed state with the airbag coupled to the panel assembly. The component may comprise a cover plate for the airbag chute configured to support the airbag; the cover plate may be configured for (a) an unassembled state in the open state of the panel assembly; (b) an assembled state in the closed state of the panel assembly.

The present invention relates to a component for a vehicle interior configured for deployment of an airbag into the vehicle interior comprising a panel assembly and an airbag. The panel assembly may comprise an airbag chute coupled to a structural substrate. The panel assembly may be configured for (a) an open state with the airbag chute accessible for assembly of the airbag and (b) a closed state with the airbag coupled to the panel assembly. The component may comprise a cover plate for the airbag chute configured to support the airbag. The cover plate may be configured for (a) an unassembled state in the open state of the panel assembly; (b) an assembled state in the closed state of the panel assembly. The cover plate may be configured to position the airbag between the cover plate and the structural substrate. The cover plate may be configured to be staked to the airbag chute. The airbag may be coupled between the cover plate and the airbag chute. The component may comprise an inflator configured to deploy the airbag. The inflator may be configured to couple the airbag and the cover plate. The airbag may comprise a retainer coupled to an airbag component. The component may comprise an inflator configured to deploy the airbag component. The cover plate may be coupled between the inflator and the airbag component. The airbag component may be coupled between the cover plate and the retainer. The airbag may comprise a fastener configured to couple the retainer to the airbag component. The fastener may be configured to couple the inflator to the cover plate. The fastener may be configured to couple the inflator to the airbag. The fastener may be configured to couple the cover plate between the inflator and the airbag. The component may comprise a closure configured to secure the inflator to the cover plate. The component may comprise a closure configured to secure the inflator to the airbag. The component may comprise a closure configured to secure the cover plate between the inflator and the airbag. The component may comprise a nut; the fastener may comprise a stud. The nut may comprise a set of nuts; the stud may comprise a set of studs. The airbag component may comprise a hole; the cover plate may comprise a hole; the inflator may comprise a hole; the stud may be configured to extend through the hole of the airbag component; the stud may be configured to extend through the hole of the cover plate; the stud may be configured to extend through the hole of the inflator. The nut may be configured to clamp the cover plate between the inflator and the airbag. The component may comprise an inflator configured to deploy the airbag; the cover plate may be configured to couple the airbag to the airbag chute. The inflator may be coupled to the cover plate; the inflator may be indirectly coupled to the airbag by the cover plate. The component may comprise at least one of (a) a trim component; (b) an instrument panel; (c) a door panel.

The present invention relates to a method of producing an instrument panel assembly configured for an airbag actuated by an inflator comprising the steps of forming a substrate for the instrument panel, providing a housing for the airbag on the substrate of the instrument panel and providing a cover plate for the housing. The housing may comprise a chute for the airbag. The cover plate may be configured for attachment of the airbag to the cover plate so that the instrument panel assembly may comprise the instrument panel with the housing attached to the substrate and the airbag attached to the cover plate. The method may comprise the step of assembling the airbag by providing the airbag within the chute of the housing and attaching the cover plate to the housing and attaching the inflator to the cover plate. The airbag may be attached to the housing by the cover plate. The airbag may be enclosed by the cover plate. The airbag may be assembled by attachment of the inflator to the cover plate. The airbag may be assembled by attachment of a retainer of the airbag to the inflator. The housing may comprise an injection molded structure. The airbag may comprise an airbag component and a retainer. The retainer may be configured to attach the inflator to the housing. The retainer may be configured to attach the inflator to the airbag component. The retainer may be configured to attach to the cover plate by a set of fasteners. The airbag may comprise a set of posts; the set of fasteners may be configured for attachment to the set of posts to attach the airbag to the cover plate. The cover plate may comprise a set of apertures for the set of posts of the airbag. The set of posts may comprise a set of threaded posts and the set of fasteners may comprise a set of threaded fasteners. The airbag may comprise a set of posts configured for attachment to the housing. The set of posts may comprise a set of threaded posts. The airbag may comprise a set of fasteners configured for attachment to the set of threaded posts. Each fastener of the set of fasteners may be configured for attachment to a post of the set of threaded posts so that the airbag is attached to the housing. The method may comprise the step of attaching the airbag to the housing with a set of fasteners. The set of fasteners may comprise a set of threaded fasteners. The airbag may comprise a set of threaded posts. The set of threaded posts may comprise a set of bolts. The set of threaded posts may comprise a set of studs. The set of fasteners may be configured for attachment to the set of threaded posts. The set of fasteners may comprise a set of nuts. Forming the substrate for the instrument panel may comprise molding a structural substrate. Providing the housing for the airbag on the substrate of the instrument panel may comprise attaching the housing to the substrate of the instrument panel. The housing may comprise a molded structure comprising the chute for the airbag. The housing may be molded to the substrate.

The present invention relates to an instrument panel assembly comprising an airbag configured for actuation by an inflator, an instrument panel comprising a substrate, a housing for the airbag coupled to the substrate of the instrument panel and a cover plate for the housing. The housing may comprise a chute for the airbag. The cover plate may be configured to be attached to the housing for attachment of the airbag to the housing so that the airbag is attached to the housing at the cover plate. The cover plate may be configured to support the airbag. The airbag may be enclosed by the cover plate. The airbag may be assembled by attachment of the cover plate to the chute. The airbag may be assembled by attachment of a retainer to the cover plate. The airbag may comprise a retainer. The retainer may be configured to attach the airbag to the housing. The cover plate may be configured to position the airbag between the cover plate and the substrate. The airbag may be coupled between the cover plate and the chute. The instrument panel assembly may comprise an inflator configured to deploy the airbag; the inflator may be coupled to the cover plate; the inflator may be indirectly coupled to the airbag by the cover plate.

The present invention relates to a component for a vehicle interior configured for deployment of an airbag into the vehicle interior comprising a panel assembly and an airbag assembly. The panel assembly may comprise an airbag chute coupled to a structural substrate. The panel assembly may be configured for (a) an open state with the airbag chute accessible for assembly of the airbag and (b) a closed state with the airbag assembly coupled to the panel assembly. The airbag chute may comprise a door configured to support the airbag. The door may be configured for (a) an open position in the open state of the panel assembly; (b) a closed position in the closed state of the panel assembly. The door may be configured to position the airbag between the door and the structural substrate. The structural substrate may comprise a door configured to open to facilitate deployment of the airbag; the door of the airbag chute may be configured to remain in a closed position during deployment of the airbag. The door may comprise a set of doors. The component may comprise an inflator configured to deploy the airbag; the set of doors may comprise a first door and a second door; the inflator may be configured to couple the first door and the second door. The airbag assembly may comprise a retainer coupled to an airbag. The component may comprise an inflator configured to deploy the airbag. The airbag chute may be coupled between the inflator and the airbag. The airbag may be coupled between the inflator and the retainer. The airbag assembly may comprise a fastener configured to couple the retainer to the airbag. The fastener may be configured to couple the inflator to the airbag chute. The fastener may be configured to couple the inflator to the airbag assembly. The fastener may be configured to couple the airbag chute between the inflator and the airbag assembly. The component may comprise a closure configured to secure the inflator to the airbag chute. The component may comprise a closure configured to secure the inflator to the airbag assembly. The component may comprise a closure configured to secure the airbag chute between the inflator and the airbag assembly. The component may comprise a nut; the fastener may comprise a stud. The nut may comprise a set of nuts; the stud may comprise a set of studs. The airbag may comprise a hole; the airbag chute may comprise a hole; the inflator may comprise a hole; the stud may be configured to extend through the hole of the airbag; the stud may be configured to extend through the hole of the airbag chute; the stud may be configured to extend through the hole of the inflator. The nut may be configured to clamp the airbag chute between the inflator and the airbag. The component may comprise at least one of (a) a trim component; (b) an instrument panel; (c) a door panel.

The present invention relates to a method of producing an instrument panel assembly configured for an airbag assembly comprising an airbag actuated by an inflator comprising the steps of forming a substrate for the instrument panel and providing a housing for the airbag assembly on the substrate of the instrument panel. The housing may comprise a chute for the airbag and a set of flaps. The set of flaps may be configured to be folded for attachment of the airbag assembly to the housing so that the instrument panel assembly may comprise the instrument panel with the housing attached to the substrate and the airbag assembly attached to the housing. The method may comprise the step of assembling the airbag assembly by providing the airbag within the chute of the housing and folding the set of flaps of the housing over the airbag and attaching the inflator to the set of flaps of the housing. The airbag may be attached to the housing by the set of flaps. The airbag of the airbag assembly may be enclosed by the set of flaps of the housing. The airbag assembly may be assembled by attachment of the inflator to the set of flaps of the housing. The airbag assembly may be assembled by attachment of a retainer of the set of flaps of the housing. The housing may comprise a set of hinges for the set of flaps. Each hinge of the set of hinges may comprise a living hinge. The housing may comprise a molded structure with the set of flaps and the set of hinges. The housing may comprise an injection molded structure. The method may comprise the step of folding each flap of the set of flaps of the housing for attachment of the airbag assembly. The method may comprise the step of attaching the airbag assembly to the housing. The method may comprise the step of attaching the airbag assembly may comprise attaching the airbag assembly to each flap of the set of flaps. The airbag assembly may comprise a retainer. The step of attaching the airbag assembly may comprise attaching the retainer to each flap of the set of flaps. The step of attaching the airbag assembly may comprise fastening the inflator to each flap of the set of flaps. The retainer may be configured to attach the inflator to the housing. The retainer may be configured to attach the inflator to the airbag. The retainer may be configured to attach to the housing by a set of fasteners. The airbag assembly may comprise a set of posts; the set of fasteners may be configured for attachment to the set of posts to attach the airbag assembly to the housing. The set of flaps of the housing may comprise a set of apertures for the set of posts of the airbag assembly. The method may comprise the step of attaching the airbag assembly to the housing. The method may comprise the step of attaching the airbag assembly to the housing. The method may comprise the step of folding the set of flaps of the housing. The housing may comprise a set of hinges for the set of flaps. Each flap of the set of flaps may comprise a hinge. The hinge may comprise a living hinge. Each flap may be configured to be folded at the hinge. The method may comprise the step of attaching the airbag assembly to the housing. The method may comprise the step of attaching the airbag assembly to the housing. The method may comprise folding the set of flaps of the housing and securing the airbag assembly to the set of flaps of the housing on a set of posts with a set of fasteners. The set of posts may comprise a set of threaded posts and the set of fasteners may comprise a set of threaded fasteners. The airbag assembly may comprise a set of posts configured for attachment to the housing. The set of posts may comprise a set of threaded posts. The airbag assembly may comprise a set of fasteners configured for attachment to the set of threaded posts. Each fastener of the set of fasteners may be configured for attachment to a post of the set of threaded posts so that the airbag assembly is attached to the housing. The method may comprise the step of attaching the airbag assembly to the housing with a set of fasteners. The set of fasteners may comprise a set of threaded fasteners. The airbag may comprise a set of threaded posts. The set of threaded posts may comprise a set of studs. The set of threaded fasteners may be configured for attachment to the set of threaded posts. The set of threaded fasteners may comprise a set of nuts. The set of threaded posts may comprise a set of bolts. The set of flaps may comprise a set of doors. The method may comprise the step of attaching the airbag assembly to the housing. The method may comprise assembling the airbag assembly to the set of doors of the housing with a set of fasteners. Attaching the airbag assembly to the housing may comprise closing the set of doors to enclose the airbag within the chute. Assembling the airbag assembly to the set of doors of the housing may comprise securing the inflator to the set of doors with a retainer. Forming the substrate for the instrument panel may comprise molding a structural substrate. Providing the housing for the airbag assembly on the substrate of the instrument panel may comprise attaching the housing to the substrate of the instrument panel. The housing may comprise a molded structure comprising the chute for the airbag and the set of flaps. The housing may be molded to the substrate. The set of flaps may be configured to be folded for attachment of the airbag assembly to the housing.

The present invention relates to an instrument panel assembly comprising an airbag assembly comprising an airbag actuated by an inflator, an instrument panel comprising a substrate and a housing for the airbag assembly coupled to the substrate of the instrument panel. The housing may comprise a chute for the airbag and a set of flaps. The set of flaps of the housing may be configured to be folded for attachment of the airbag assembly to the housing so that the airbag assembly is attached to the housing at the set of flaps. The airbag may be attached to the housing by the set of flaps. The airbag of the airbag assembly may be enclosed by the set of flaps of the housing. The airbag assembly may be assembled by attachment of the inflator to the set of flaps of the housing. The airbag assembly may be assembled by attachment of a retainer of the set of flaps of the housing. The airbag assembly may comprise a retainer. The retainer may be configured to attach the airbag assembly to the set of flaps. The housing may comprise a set of hinges for the set of flaps. Each hinge of the set of hinges may comprise a living hinge. The housing may comprise a molded structure with the set of flaps and the set of hinges. The housing may comprise an injection molded structure. The set of flaps may comprise a set of doors. The set of doors may be configured to be closed to retain the airbag within the chute. The airbag assembly may be configured to be secured to the housing by attachment to the set of doors of the housing. The instrument panel assembly may comprise a trim panel assembly.

FIGURES

FIGS. 8A through 8D are schematic partial perspective views of a method for forming a vehicle interior component according to an exemplary embodiment.

FIG. 20B is a schematic flow diagram of a method for forming a vehicle interior component according to an exemplary embodiment.

FIG. 20C is a schematic flow diagram of a method for forming a vehicle interior component according to an exemplary embodiment.

DESCRIPTION

Figure 1A:
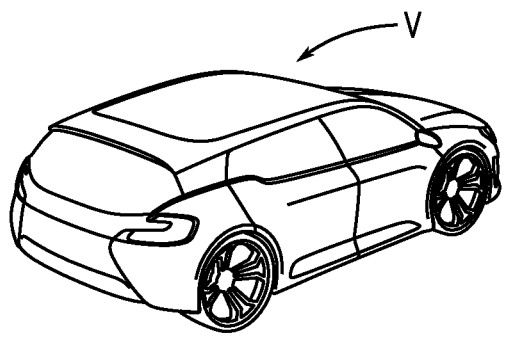
FIG. 1A is a schematic perspective view of a vehicle according to an exemplary embodiment.
Figure 1B:
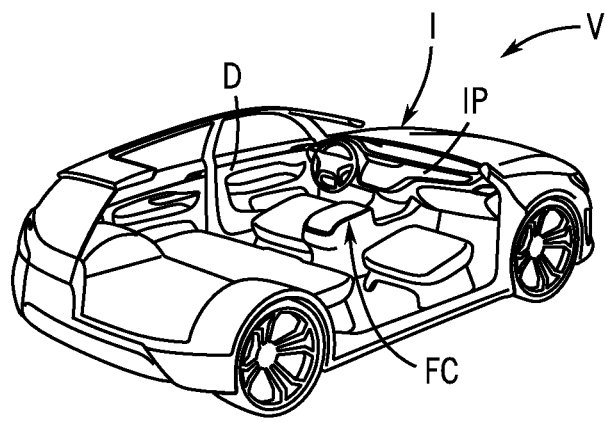
FIG. 1B is a schematic perspective cut-away view of a vehicle showing a vehicle interior according to an exemplary embodiment.
Figure 2A:
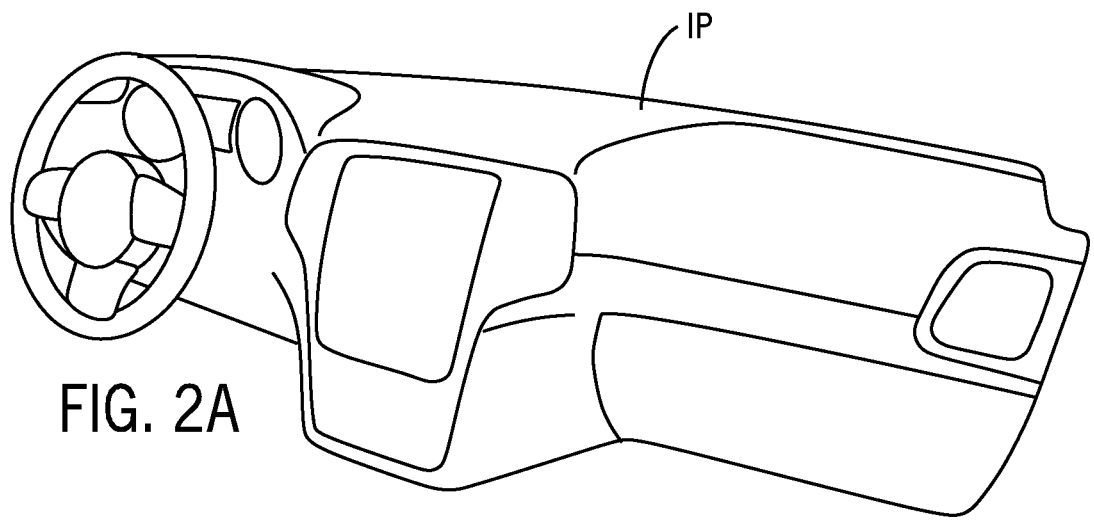
FIG. 2A is a schematic perspective view of a vehicle trim component shown as an instrument panel according to an exemplary embodiment.
Figure 2B:
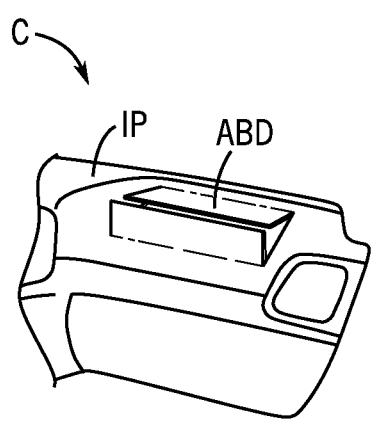
FIGS. 2B through 2D are schematic perspective detail views of an airbag deployment according to an exemplary embodiment.
Figure 2C:
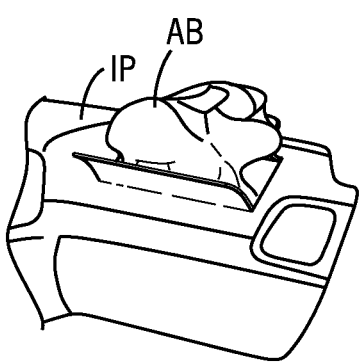
Figure 2D:
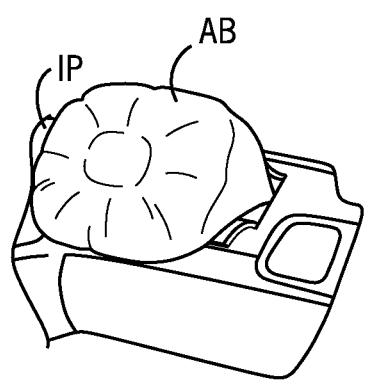
Figures 3A, 3B, 3C:
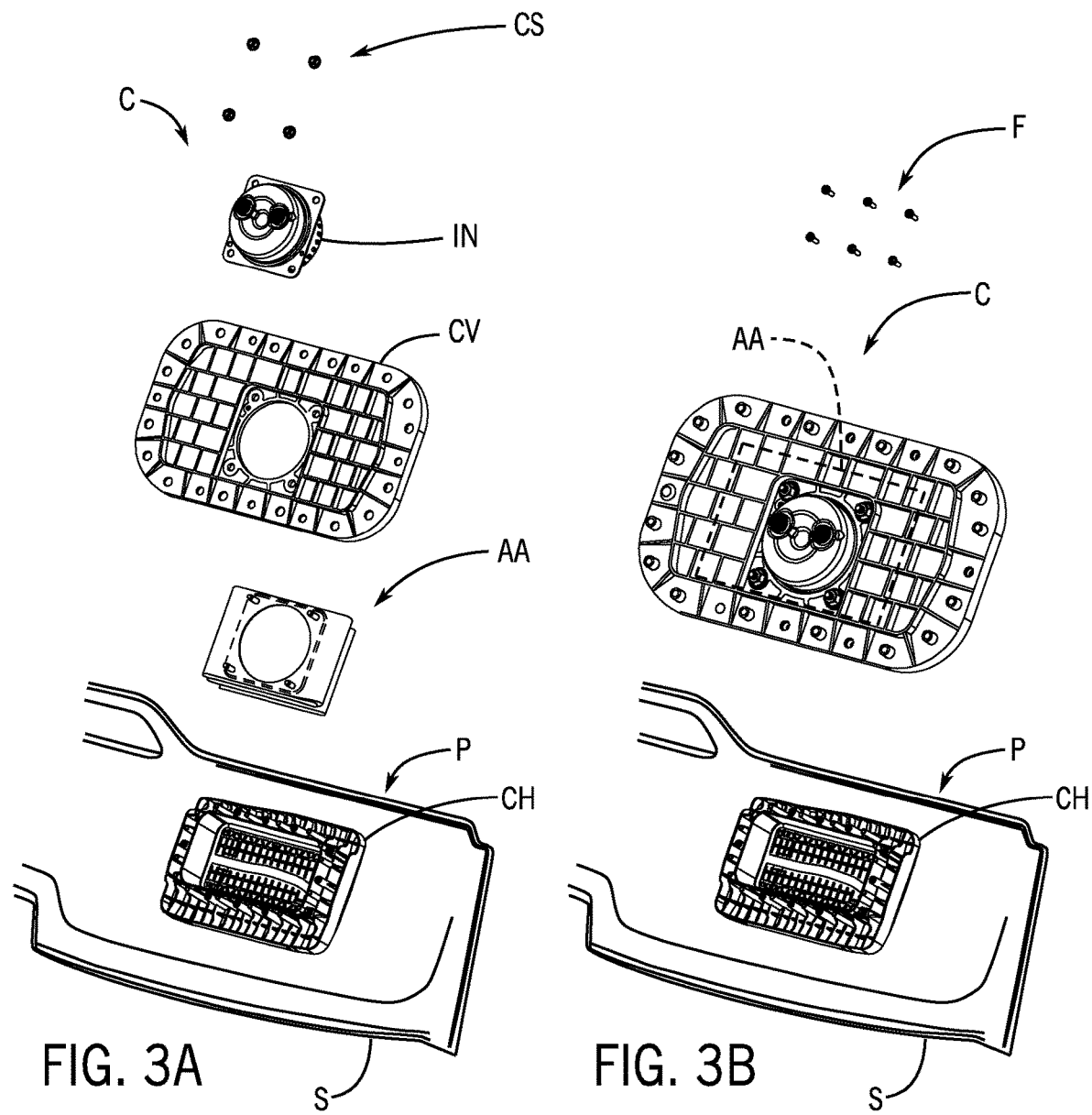
FIGS. 3A through 3C are schematic partial perspective views of a method for forming a vehicle interior component according to an exemplary embodiment.

As shown schematically according to an exemplary embodiment in FIGS. 1A-1B, a vehicle V may comprise an interior I with interior components such as a door D with door panel, console such as a floor console FC, panel such as trim/instrument panel IP. As shown schematically in FIGS. 2A-2B, the component may comprise a trim panel shown as an instrument panel IP configured with an airbag door ABD to deploy an airbag AB from an airbag module (installed behind the instrument panel IP).

As shown schematically according to an exemplary embodiment in FIGS. 2A-2D, a component C for the vehicle interior such as instrument panel IP may comprise an assembly comprising an airbag AB that is configured to be deployed through an airbag door ABD into the vehicle interior (e.g. in an impact event). See also FIGS. 3A-3C, 5, 6, 8A-8D, 10A-10F, 12, 13A-13F, 17 and 18A-18E.

Figures 23A, 23B:
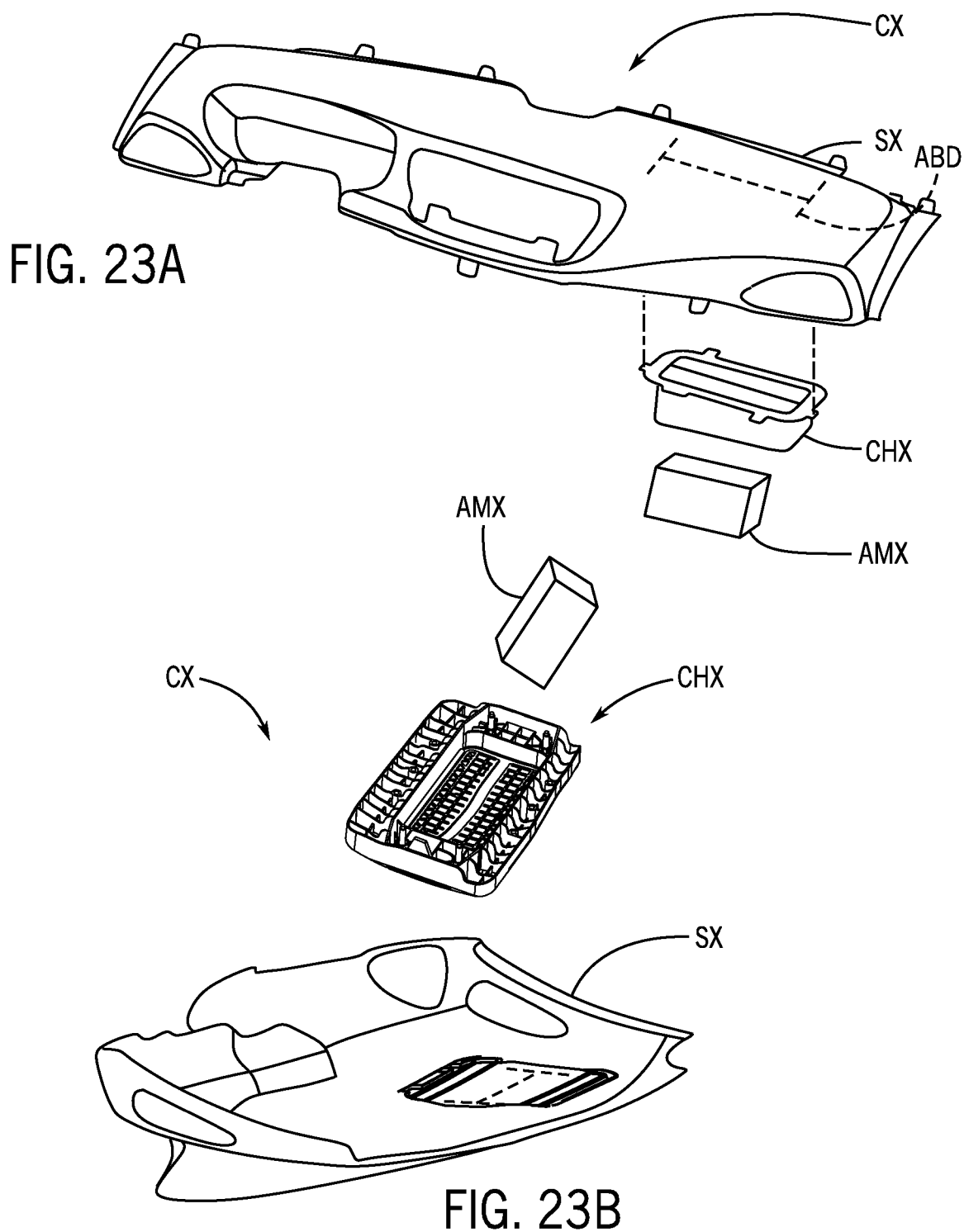
FIGS. 23A and 23B are schematic partial exploded perspective views of a conventional instrument panel.

As indicated schematically in FIGS. 23A-23B, a conventional arrangement for a component CX such as an instrument panel configured to deploy an airbag through an airbag door ABD may comprise a substrate/panel SX with an airbag chute CHX into which is installed an airbag module AMX (with an airbag, inflator, etc. as a completed subassembly).

According to an exemplary embodiment as shown schematically in FIGS. 3A-3C, 5, 6, 7, 8A-8D, 9, 10A-10F and 11, a component C (such as an instrument panel or other trim panel) may comprise an assembly comprising a panel/substrate S with an airbag chute CH providing a panel assembly P for assembly of an airbag AB and airbag inflator IN with cover CV. See also FIGS. 9 and 11.

Figure 4A:
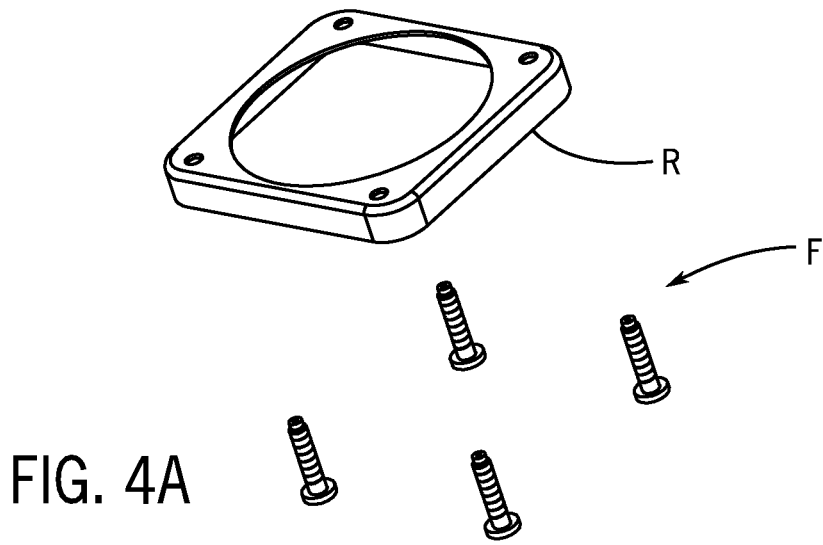
FIGS. 4A and 4B are schematic partial perspective views of a method for forming a vehicle interior component according to an exemplary embodiment.
Figure 4B:
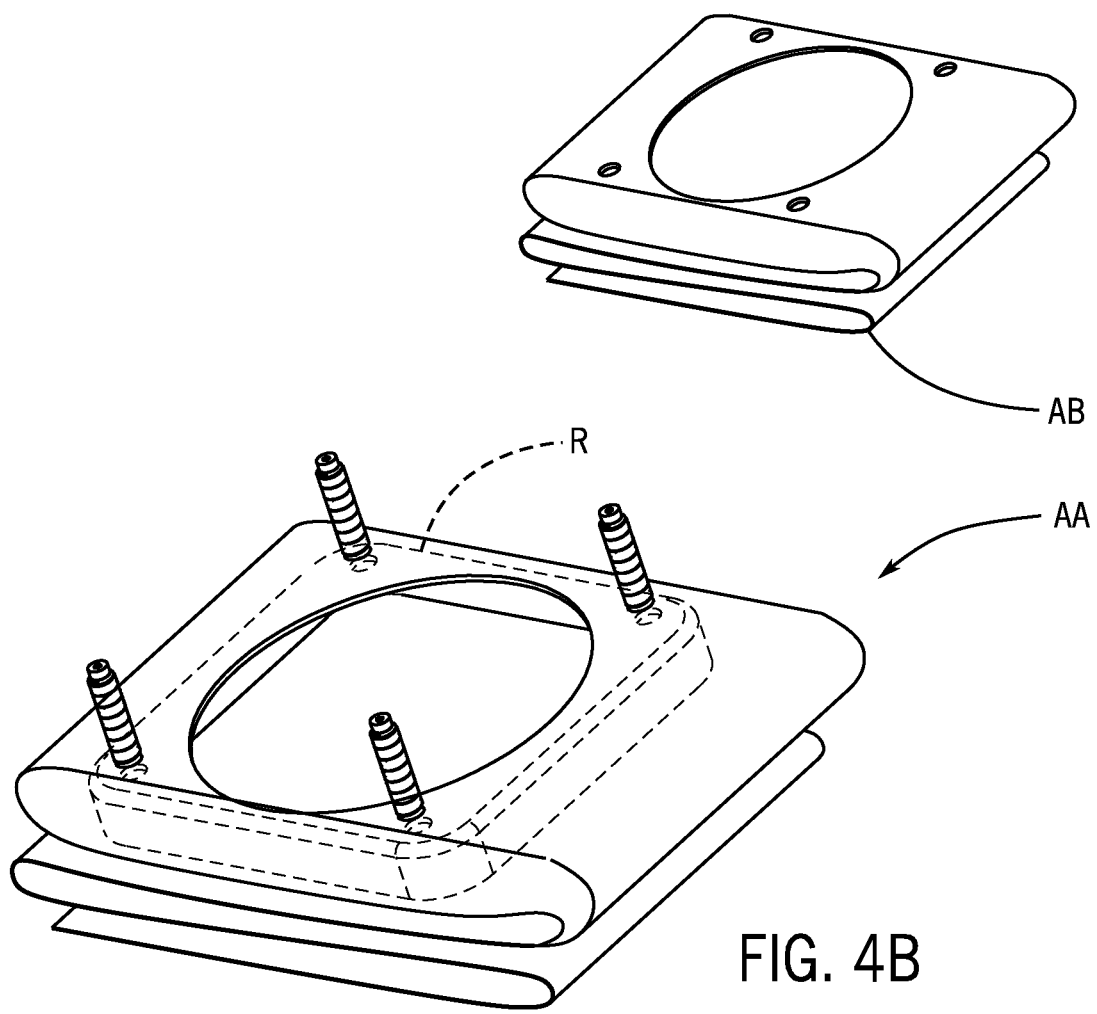
Figure 5:
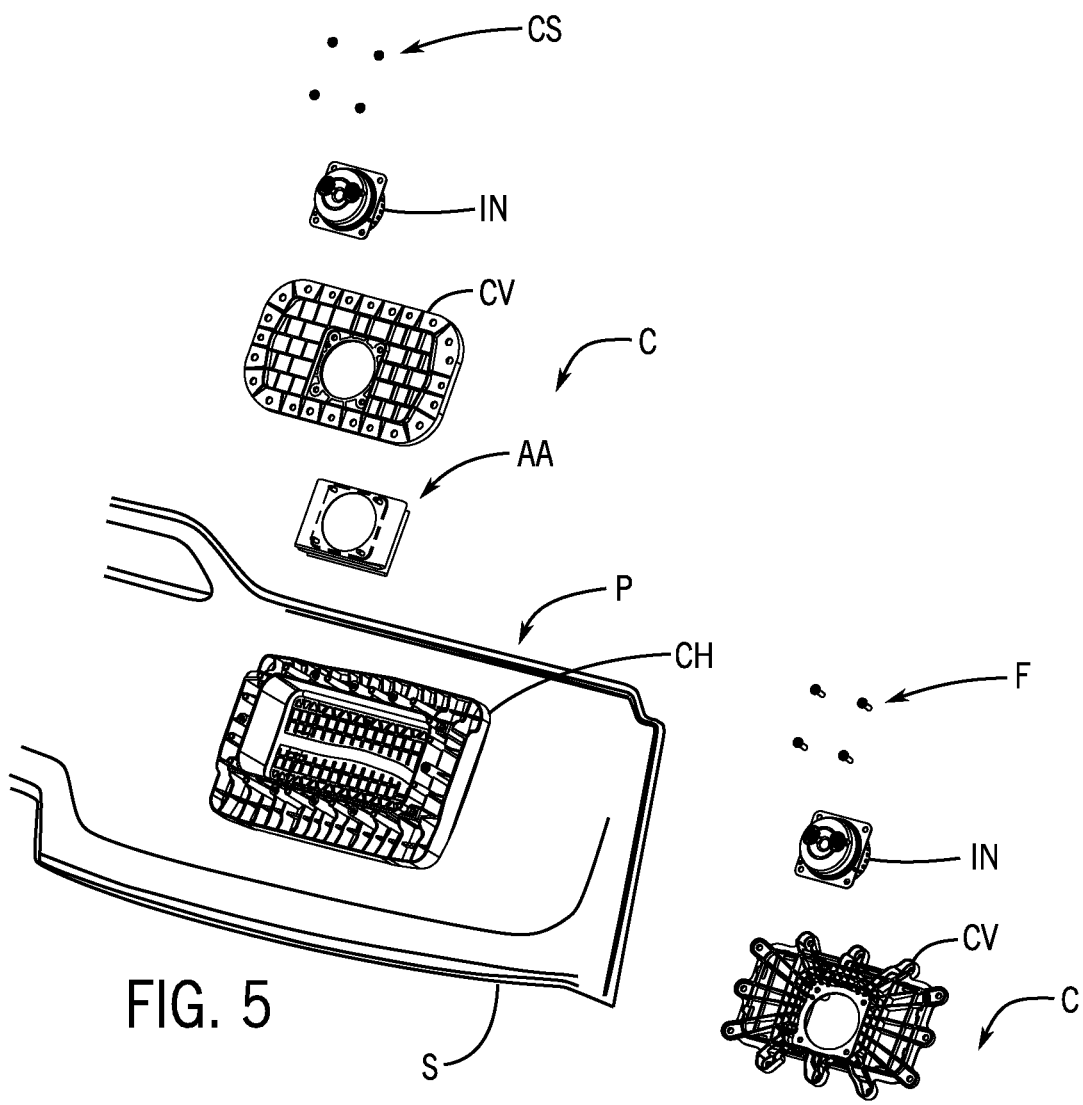
FIG. 5 is a schematic partial exploded perspective view of a vehicle interior component according to an exemplary embodiment.
Figure 6:
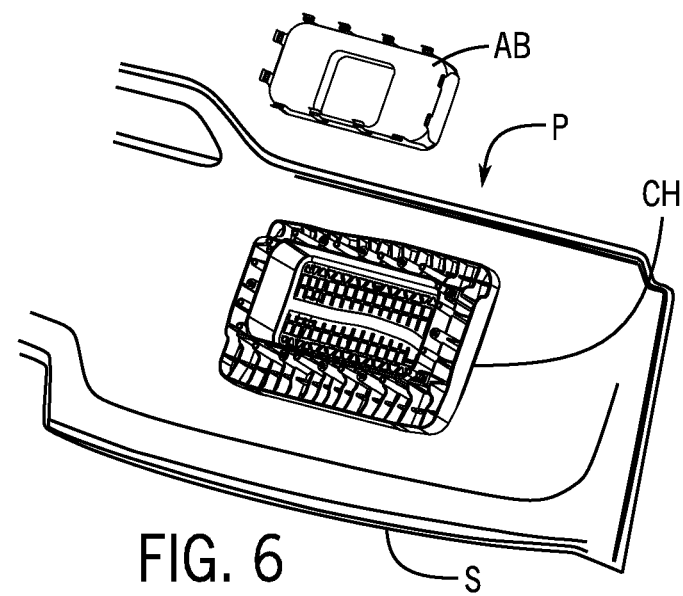
FIG. 6 is a schematic partial exploded perspective view of a vehicle interior component according to an exemplary embodiment.
Figure 7:
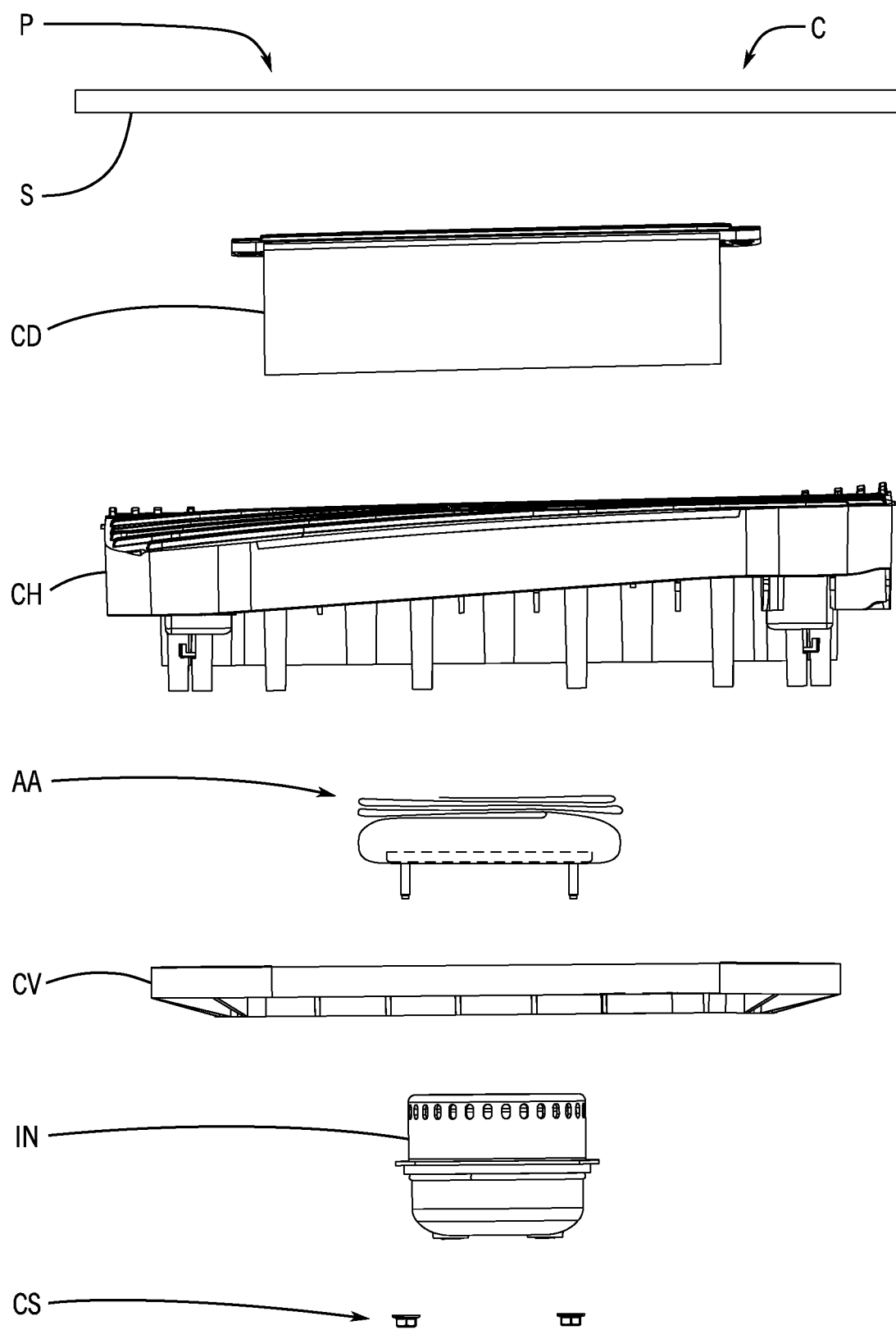
FIG. 7 is a schematic partial exploded section view of a vehicle interior component according to an exemplary embodiment.

As indicated schematically in FIGS. 4, 5 and 6, airbag AB may be provided in an airbag assembly AA and assembled to cover CV with airbag inflator IN onto panel assembly P comprising substrate/panel S and airbag chute CH. See also FIGS. 10A-10F, 12, 13A-13F, 14, 17 and 18A-18E. As indicated schematically in FIGS. 4A-4B, an airbag assembly AA may comprise a component such as an airbag AB and a retainer R with a fastener arrangement F; airbag assembly AA (e.g. with airbag component) may be configured for installation/assembly into panel assembly P with airbag chute CH as indicated schematically in FIGS. 5, 6, 10A-10F, 12, 13A-13F, 14, 17 and 18A-18E.

Figure 9:
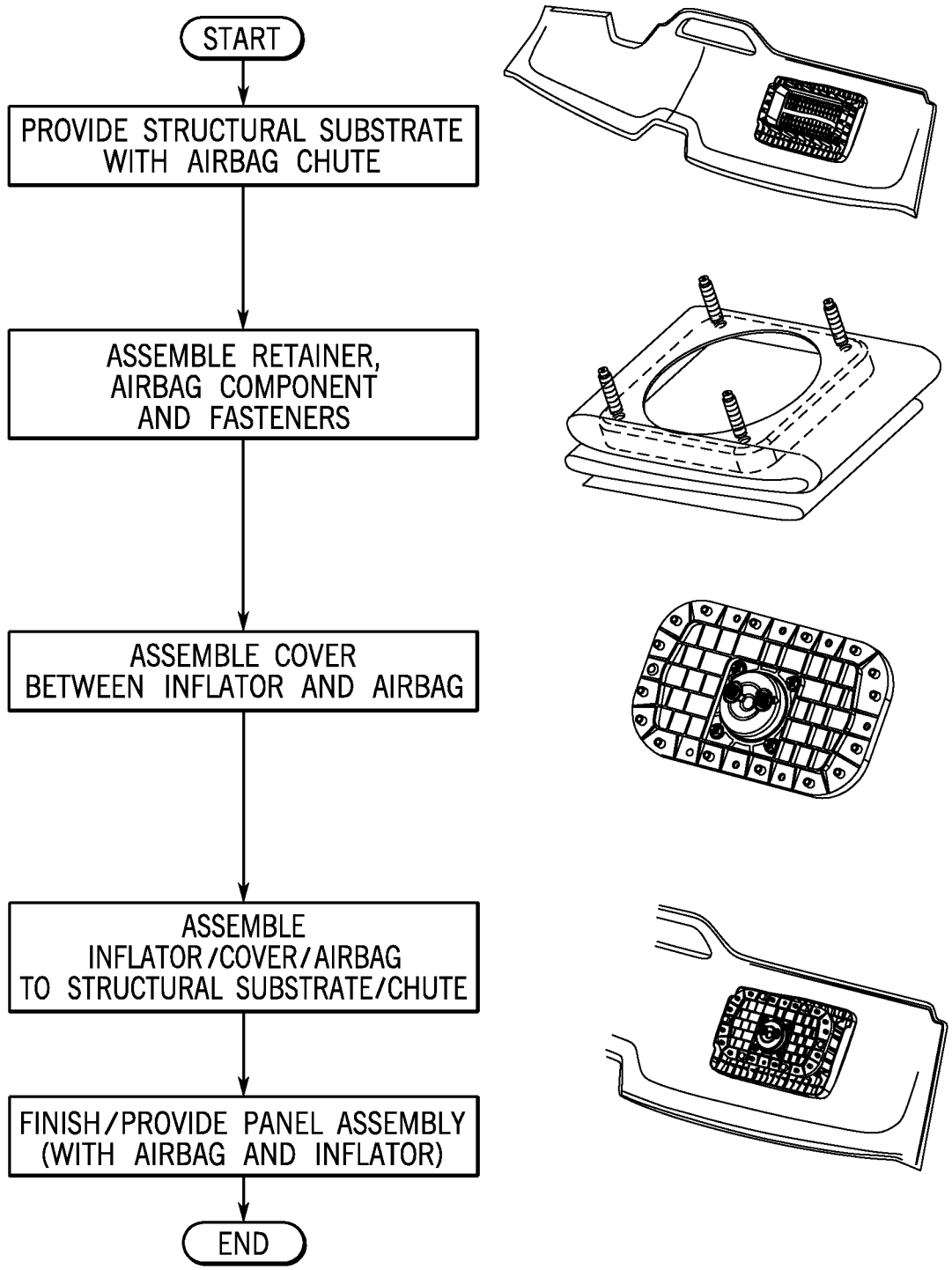
FIG. 9 is a schematic flow diagram of a method for forming a vehicle interior component according to an exemplary embodiment.
Figure 10A:
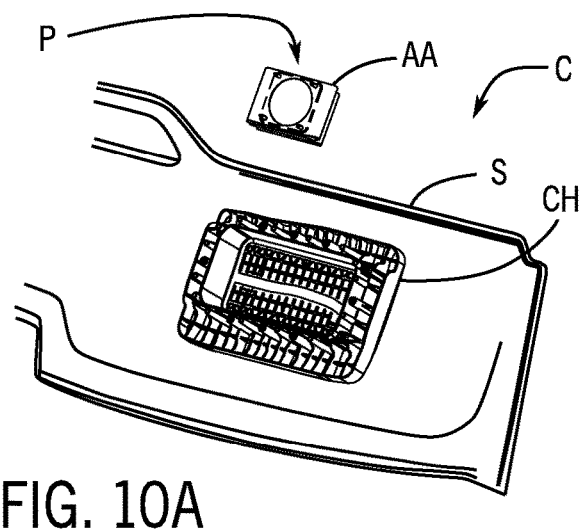
FIGS. 10A through 10F are schematic partial perspective views of a method for forming a vehicle interior component according to an exemplary embodiment.
Figure 10B:
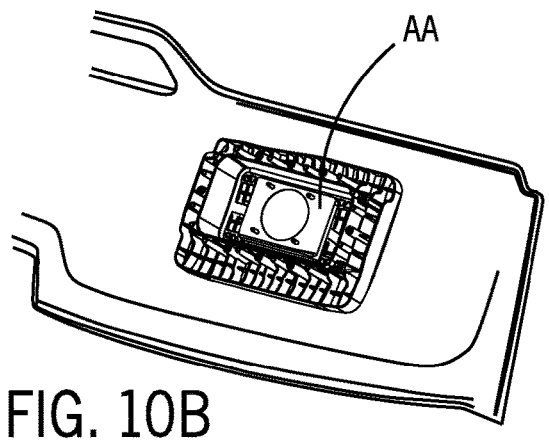
Figure 10C:
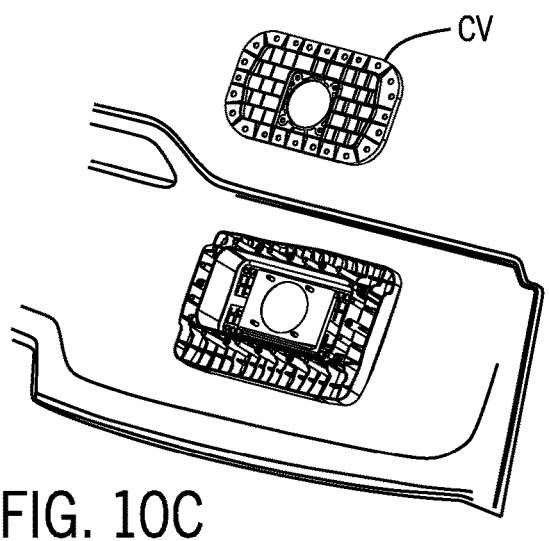
Figure 10D:
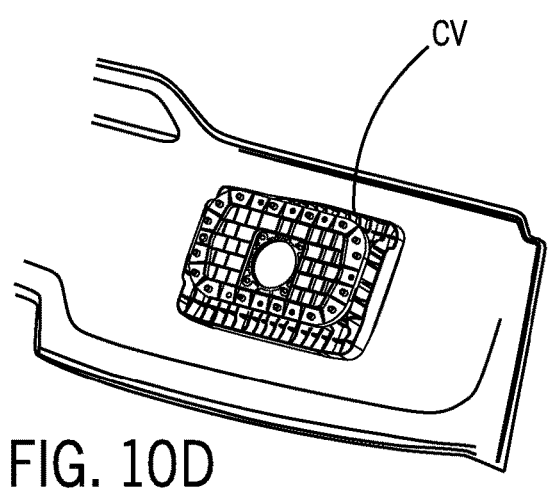
Figure 10E:
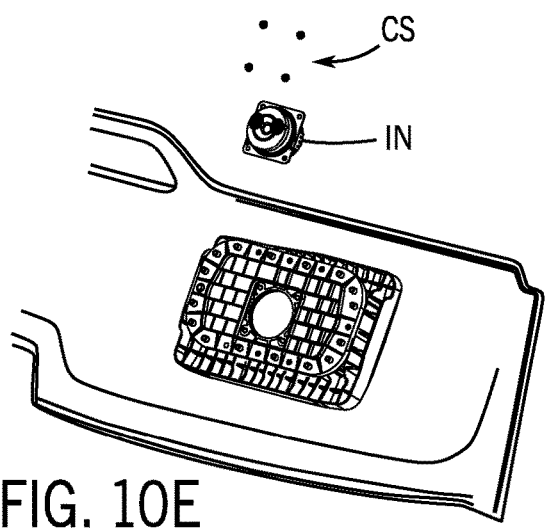
Figure 10F:
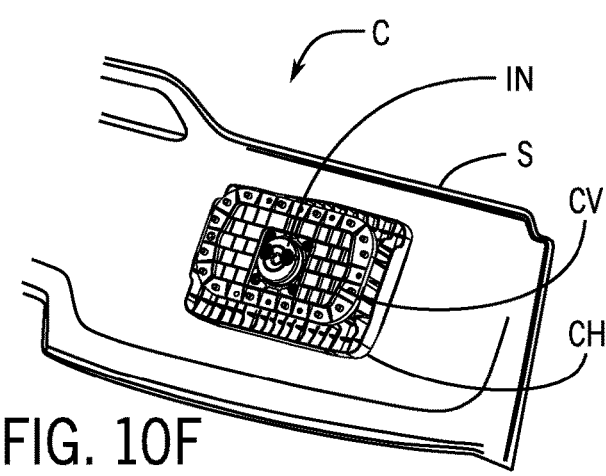
Figure 11:
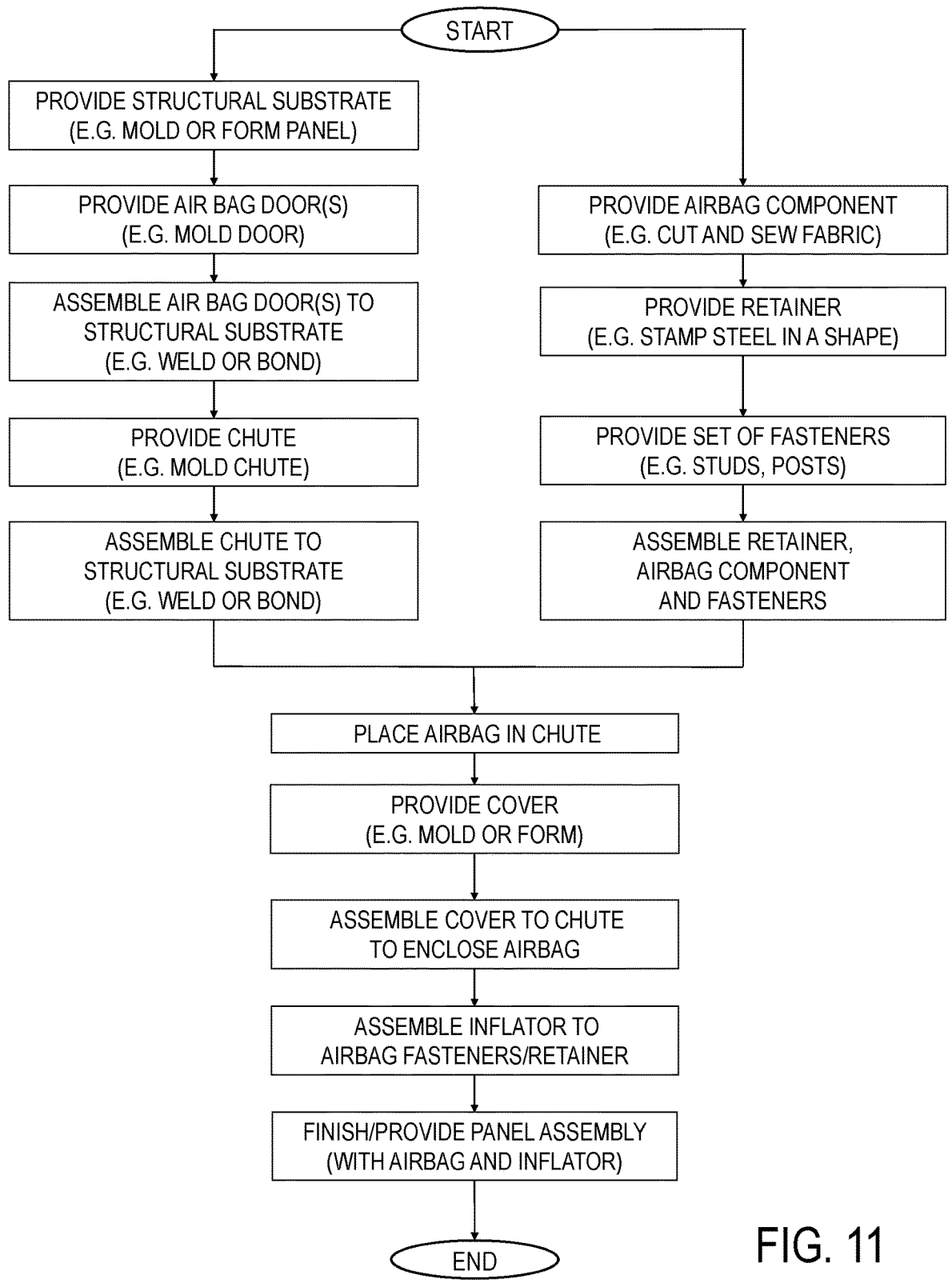
FIG. 11 is a schematic flow diagram of a method for forming a vehicle interior component according to an exemplary embodiment.
Figure 12:
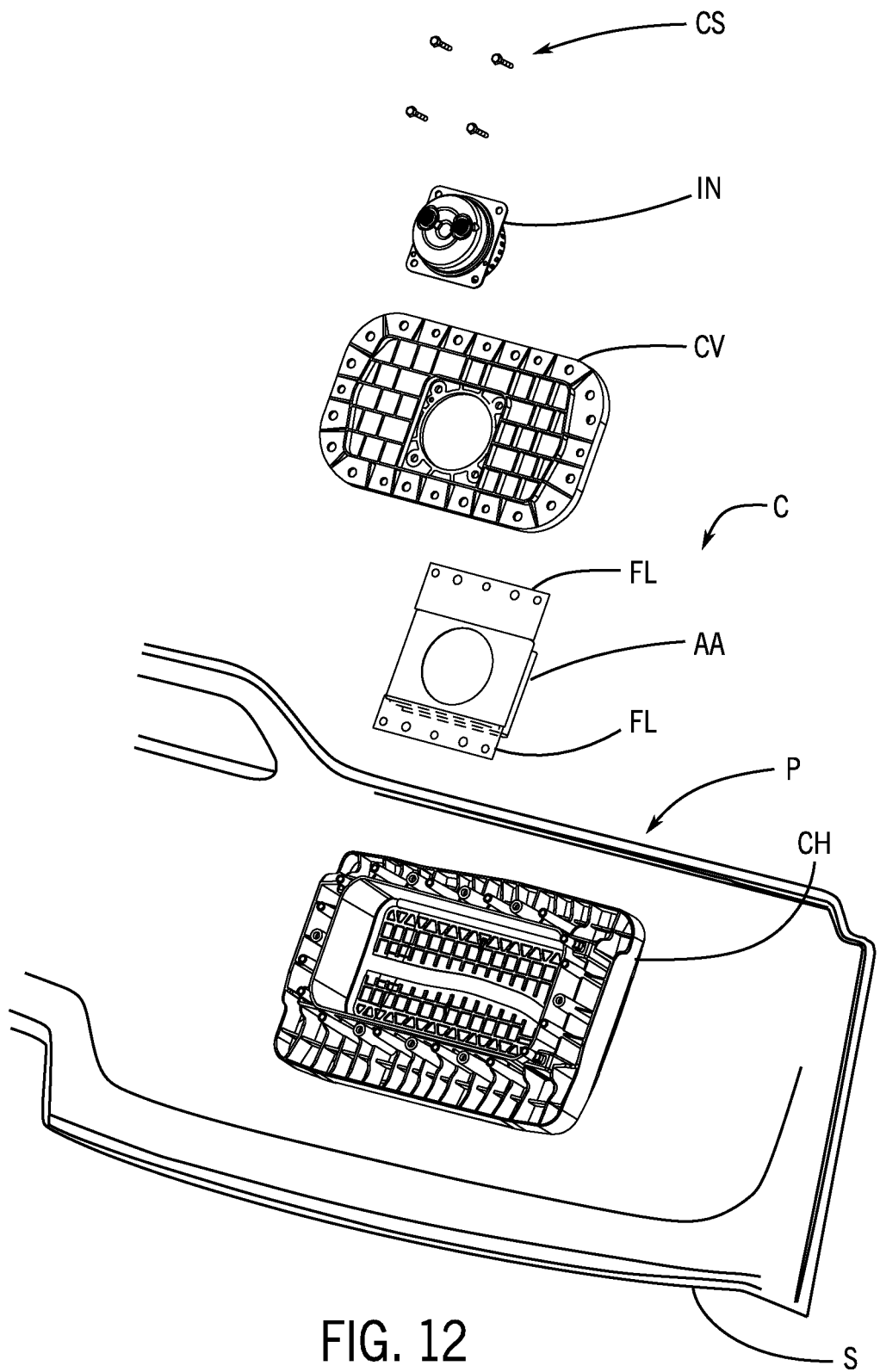
FIG. 12 is a schematic partial exploded perspective view of a vehicle interior component according to an exemplary embodiment.
Figure 13A:
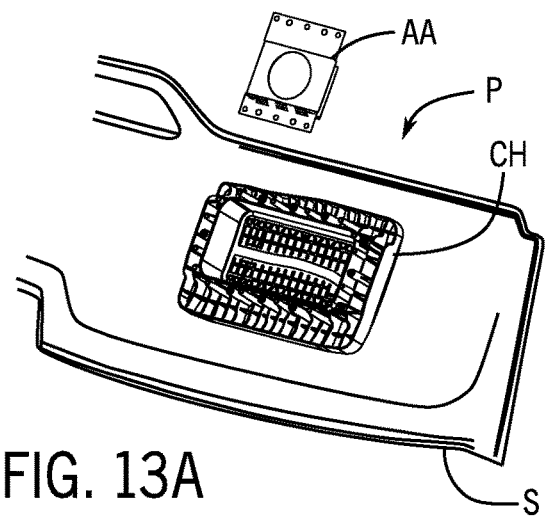
FIGS. 13A through 13F are schematic partial perspective views of a method for forming a vehicle interior component according to an exemplary embodiment.
Figure 13B:
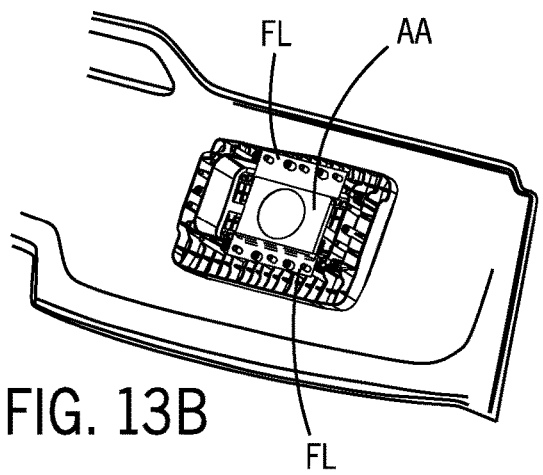
Figure 13C:
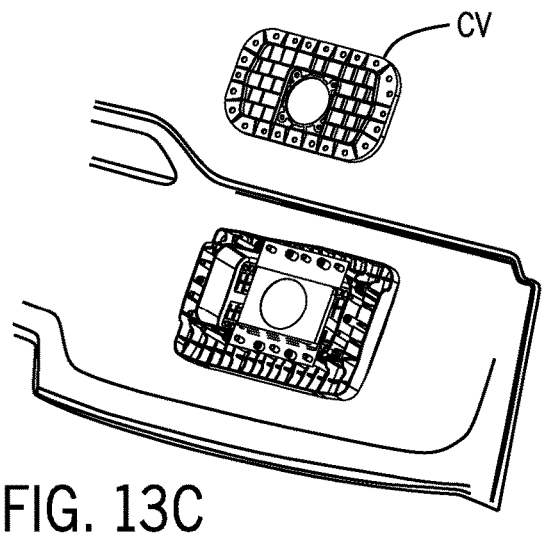
Figure 13D:
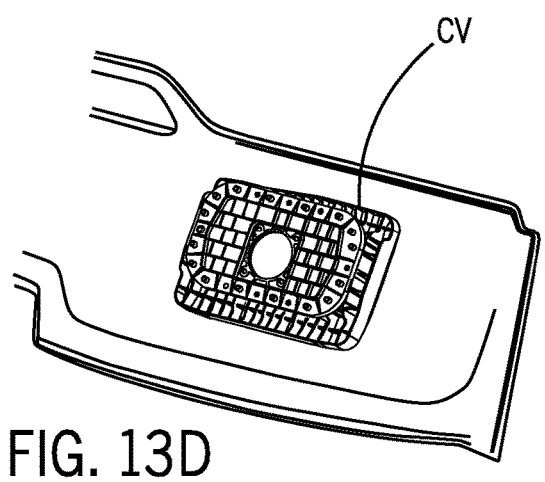
Figure 13E:
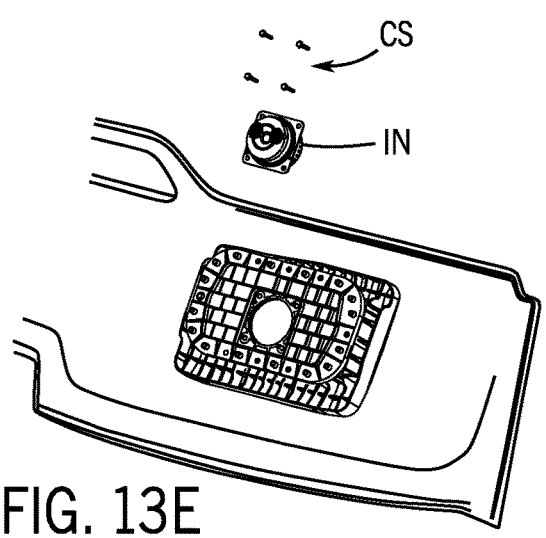
Figure 13F:
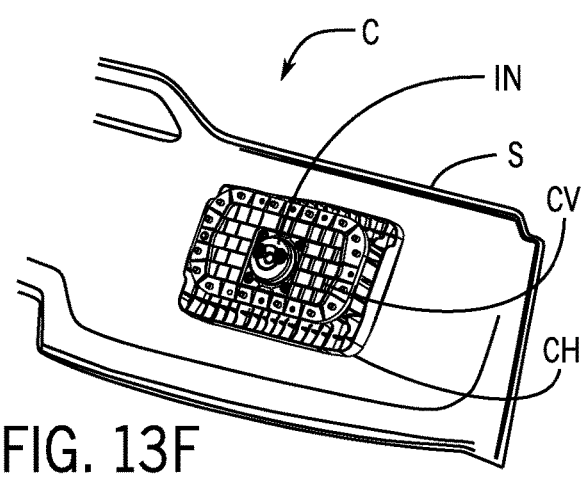
Figure 14:
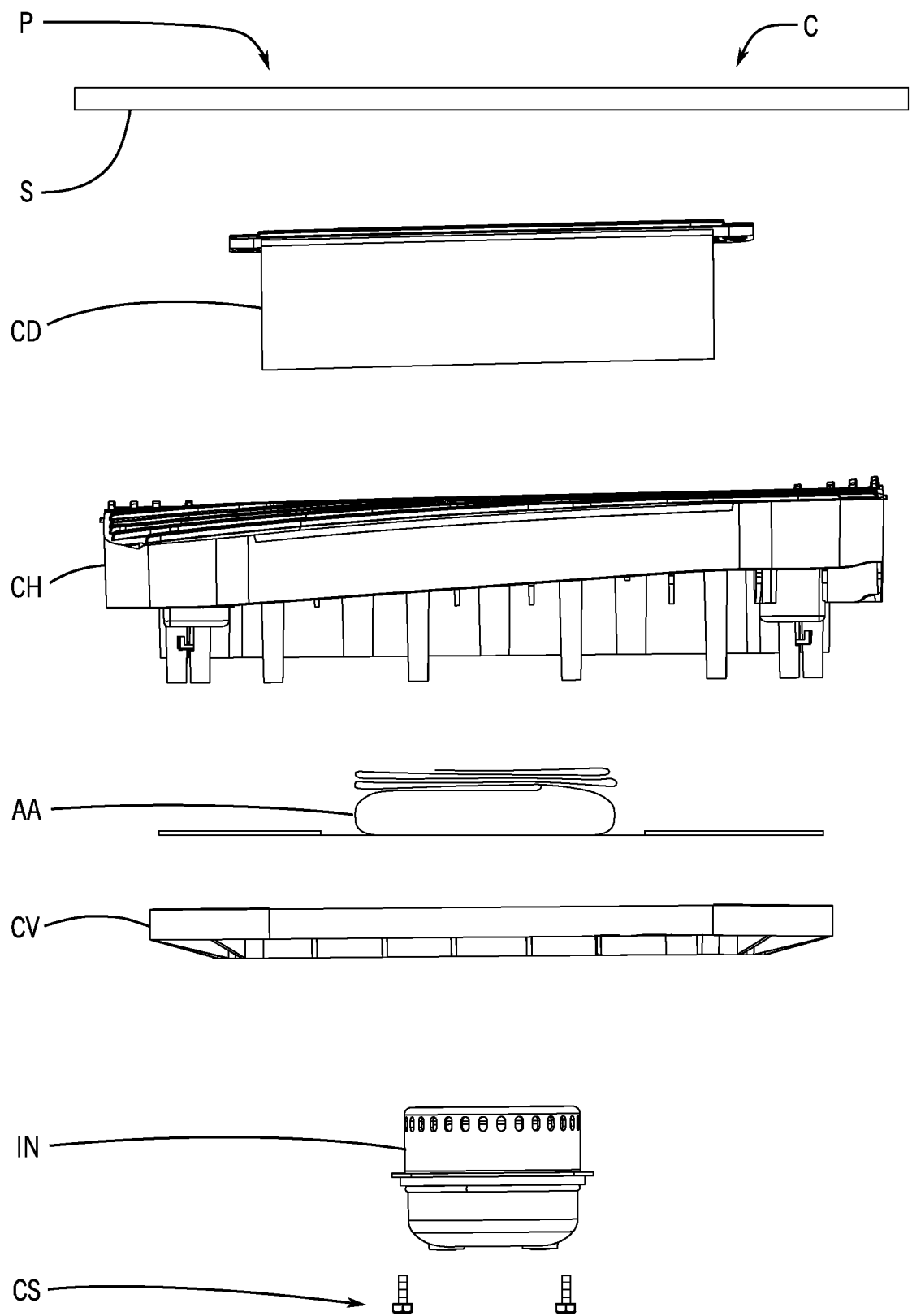
FIG. 14 is a schematic partial exploded section view of a vehicle interior component according to an exemplary embodiment.

As indicated schematically according to an exemplary embodiment in FIGS. 9 and 11, component C providing airbag AB may be assembled with panel assembly P with airbag chute CH providing a housing and with cover CV and/or retainer R providing for attachment (e.g. with a fastener arrangement comprising a set of fasteners F). See also FIGS. 3A-3C, 5, 6, 8A-8D, 10A-10F, 12, 13A-13F, 17 and 18A-18E.

According to an exemplary embodiment as shown schematically in FIGS. 3A-3C, 5, 6, 8A-8D, 10A-10F, 12, 13A-13F, 17 and 18A-18E, a component C for a vehicle interior configured for deployment of an airbag AB into the vehicle interior may comprise a panel assembly P comprising a substrate panel S and an airbag chute CH, an airbag AB, an inflator IN configured to inflate airbag AB and a cover CV assembled to airbag chute CH. See also FIGS. 9, 11, 15, 20A-20B and 21. Panel assembly P may be configured to provide an airbag door for deployment of airbag AB. Cover CV may be configured to retain airbag AB to airbag chute CH. Component C may comprise a retainer R for airbag AB. Retainer R may comprise at least one of (a) a frame; (b) a frame retained by a fastener arrangement F. Cover CV may comprise a retainer for airbag AB; cover CV may comprise a cover plate. Cover CV may be provided between inflator IN and airbag AB. Inflator IN may be assembled to cover CV. Airbag AB may be provided between cover CV and substrate panel S. Component C may comprise a mount configured to assemble inflator IN to airbag AB. The mount may comprise a retainer R. Cover CV may be configured to secure inflator IN to panel assembly P. Cover CV may comprise at least one of (a) a cover plate; (b) a cover plate comprising at least one door; (c) a closure; (d) a set of doors; (e) a closure comprising a set of doors; (f) a closure configured to secure inflator IN to airbag AB. Component C may comprise an airbag assembly AA comprising a retainer R and airbag AB. Component C may comprise a fastener arrangement F configured to couple cover CV to panel assembly P. Component C may comprise a fastener arrangement F configured to retain inflator IN to panel assembly P by cover CV. Fastener arrangement F may be configured to couple inflator IN to airbag chute CH. Cover CV may comprise a hole pattern configured for a fastener arrangement F; inflator IN may comprise a hole pattern configured for a fastener arrangement F. Component C may comprise a fastener arrangement F configured to clamp cover CV between inflator IN and airbag AB. Cover CV may be configured to couple inflator IN to airbag chute CH. Inflator IN may be assembled to a retainer R. Cover CV may comprise a cover plate; substrate panel S may comprise a structural substrate. Airbag AB may be coupled between cover CV and airbag chute CH. Inflator IN may be configured to couple airbag AB and cover CV. Cover CV may be configured to couple airbag AB and inflator IN to panel assembly P. Cover CV may be coupled between airbag AB and inflator IN. Panel assembly P may be configured for (a) an open state with airbag chute CH accessible for assembly of airbag AB and (b) a closed state with airbag AB and inflator IN coupled to panel assembly P by cover CV. Cover CV and panel assembly P may be configured to provide a compartment for airbag AB. Inflator IN may be configured to extend through cover CV into the compartment. Inflator IN may be configured to extend through an opening in cover CV (a) in a first direction toward panel substrate S and (b) in a second direction away from panel substrate S. Component C may comprise a fastener; cover CV may comprise a hole; inflator IN may comprise a hole; the fastener may be configured to extend through the hole of inflator IN; the fastener may be configured to extend through the hole of cover CV. The fastener may be configured to couple cover CV and inflator IN and airbag AB. Component C may comprise at least one of (a) a trim component; (b) an instrument panel; (c) a door panel.

According to an exemplary embodiment as shown schematically in FIGS. 3A-3C, 5, 6, 8A-8D, 10A-10F, 12, 13A-13F, 17 and 18A-18E, an instrument panel providing a panel assembly P configured to provide an airbag AB configured to be inflated by an inflator IN for deployment into a vehicle interior may comprise a panel comprising a substrate, a housing for airbag AB coupled to the substrate of the panel, and a cover CV configured to retain airbag AB and inflator IN to the housing. See also FIGS. 9, 11, and 15. The housing may be configured to provide an airbag chute CH for deployment of airbag AB. Cover CV may be configured to be attached to the housing for assembly of airbag AB to the housing. Airbag AB may be assembled to the housing by attachment of cover CV to the housing. Cover CV may be configured to support airbag AB. Cover CV may comprise a cover plate; airbag AB may be enclosed by the cover plate. Airbag AB may be assembled by attachment of the cover plate to airbag chute CH. Instrument panel assembly P may comprise an airbag assembly AA comprising airbag AB; airbag assembly AA may be configured to be assembled to the housing by cover CV. Airbag AB may be coupled between cover CV and airbag chute CH. Inflator IN may be configured to be coupled to cover CV.

According to an exemplary embodiment as shown schematically in FIGS. 3A-3C, 5, 6, 8A-8D, 10A-10F, 12, 13A-13F, 17 and 18A-18E, a component C for a vehicle interior configured for deployment of an airbag AB into the vehicle interior may comprise a panel assembly P comprising a substrate panel S and an airbag chute CH, an airbag AB, an inflator IN configured to inflate airbag AB, and a retainer R assembled to airbag AB. See also FIGS. 9, 11, 15, 20A-20B and 21. Panel assembly P may be configured to provide an airbag door for deployment of airbag AB. Retainer R may be configured to retain airbag AB to airbag chute CH. Component C may comprise a cover CV for airbag chute CH. Cover CV may comprise a cover plate assembled to airbag chute CH. Cover CV may be provided between inflator IN and airbag AB. Inflator IN may be assembled to retainer R. Component C may comprise a mount configured for retainer R; the mount may be configured for assembly of inflator IN to airbag AB. Retainer R may be configured to secure inflator IN to panel assembly P. Retainer R may comprise at least one of (a) a frame; (b) a frame retained by a fastener arrangement F. Component C may comprise an airbag assembly AA comprising retainer R and airbag AB. Component C may comprise a fastener arrangement F configured to couple retainer R to panel assembly P. Fastener arrangement F may be configured to retain inflator IN to panel assembly P by retainer R. Fastener arrangement F may be configured to couple inflator IN to airbag chute CH. Airbag AB may comprise a hole pattern configured for fastener arrangement F; retainer R may comprise a hole pattern configured for fastener arrangement F; inflator IN may comprise a hole pattern configured for fastener arrangement F. Fastener arrangement F may be configured to clamp retainer R between inflator IN and airbag AB. Retainer R may be configured to couple airbag AB to airbag chute CH. Inflator IN may be assembled to retainer R. Panel assembly P may be configured for (a) an open state with airbag chute CH accessible for assembly of airbag AB and (b) a closed state with airbag AB coupled to panel assembly P.

According to an exemplary embodiment as shown schematically in FIGS. 9, 11, 15, 20A-20B and 21, a method of producing an instrument panel assembly P configured for attachment of an airbag AB actuated by an inflator IN may comprise the steps of forming a substrate panel S, providing a housing on substrate panel S, providing airbag AB within the housing, and providing a cover CV to retain airbag AB within the housing. See also FIGS. 3A-3C, 5, 6, 8A-8D, 10A-10F, 12, 13A-13F, 17 and 18A-18E. The housing may comprise an airbag chute CH configured to facilitate deployment of airbag AB through substrate panel S so that instrument panel assembly P may comprise substrate panel S with the housing comprising airbag chute CH with airbag AB configured for deployment. The step of providing airbag AB within the housing may comprise assembling airbag AB with inflator IN to the housing to be secured by cover CV. Airbag AB may be attached to the housing by cover CV. Airbag AB may be enclosed in the housing by cover CV. Cover CV may comprise a cover plate; airbag AB may be assembled by attachment of inflator IN to the cover plate. Airbag AB may be assembled by attachment of cover CV and inflator IN. Cover CV may be configured to attach inflator IN to the housing. Cover CV may be configured to attach inflator IN to airbag component AB. The step of providing a cover CV to retain airbag AB within the housing may comprise securing cover CV with a fastener arrangement F; fastener arrangement F may comprise a set of fasteners configured for attachment to a set of posts. Cover CV may comprise a set of apertures for attachment to airbag chute CH; the set of posts may be configured for attachment of an inflator IN for airbag AB. Cover CV may be configured for a set of posts configured for attachment of airbag AB to the housing. The set of posts may be configured for coupling an inflator IN to airbag AB. The method may comprise the step of providing an airbag assembly AA comprising a retainer R and airbag AB; airbag assembly AA may comprise a set of fasteners configured for attachment of airbag AB by retainer R. The method may comprise the step of providing a fastener arrangement F configured to couple cover CV to panel assembly P. Cover CV may comprise a hole pattern configured for fastener arrangement F; inflator IN may comprise a hole pattern configured for fastener arrangement F.

According to an exemplary embodiment as shown schematically in FIGS. 3A-3C, 5, 6, 8A-8D, 10A-10F, 12, 13A-13F, 17 and 18A-18E, a component C for a vehicle interior configured for deployment of an airbag AB into the vehicle interior may comprise a panel assembly P and an airbag AB. Panel assembly P may comprise an airbag chute CH coupled to a structural substrate. Panel assembly P may be configured for (a) an open state with airbag chute CH accessible for assembly of airbag AB and (b) a closed state with airbag AB coupled to panel assembly P. See also FIGS. 20A-20B and 21. Airbag chute CH may comprise a door configured to support airbag AB; the door may be configured for (a) an open position in the open state of panel assembly P; (b) a closed position in the closed state of panel assembly P See also FIGS. 20A-20B and 21. The door may be configured to position airbag AB between the door and the structural substrate. The structural substrate may comprise a door configured to open to facilitate deployment of airbag AB; the door of airbag chute CH may be configured to remain in a closed position during deployment of airbag AB.

According to an exemplary embodiment as shown schematically in FIGS. 3A-3C, 5, 6, 8A-8D, 10A-10F, 12, 13A-13F, 17 and 18A-18E, an instrument panel providing a panel assembly P may comprise an airbag AB configured to be actuated by an inflator IN, an instrument panel comprising a substrate, and a housing for airbag AB coupled to the substrate of the instrument panel. The housing may comprise a chute CH for airbag AB and a flap. The flap of the housing may be configured to be folded for attachment of airbag AB to the housing so that airbag AB may be attached to the housing at the flap. Airbag AB may be attached to the housing by the flap.

According to an exemplary embodiment as shown schematically in FIGS. 3A-3C, 5, 6, 8A-8D, 10A-10F, 12, 13A-13F, 17 and 18A-18E, a component C for a vehicle interior configured for deployment of an airbag AB into the vehicle interior may comprise a panel assembly P and an airbag AB. Panel assembly P may comprise an airbag chute CH coupled to a structural substrate. Panel assembly P may be configured for (a) an open state with airbag chute CH accessible for assembly of airbag AB and (b) a closed state with airbag AB coupled to panel assembly P. See also FIGS. 20A-20B, 21 and 22A-22B. Component C may comprise a cover plate for airbag chute CH configured to support airbag AB; the cover plate may be configured for (a) an unassembled state in the open state of panel assembly P; (b) an assembled state in the closed state of panel assembly P. See also FIGS. 20A-20B and 21.

Exemplary Embodiments—A

As shown schematically according to an exemplary embodiment in FIGS. 1A-1B, a vehicle V may comprise an interior I with interior components such as a door D with door panel, console such as a floor console FC, panel such as trim/instrument panel IP. As shown schematically in FIGS. 2A-2B, the component may comprise a trim panel shown as an instrument panel IP configured with an airbag door ABD to deploy an airbag AB from an airbag module (installed behind instrument panel IP). See also FIGS. 7, 12 and 14.

As shown schematically in FIGS. 23A-23B, a conventional panel assembly CX such as a trim/instrument panel may a base shown as substrate SX with a housing CHX shown as comprising a chute configured for installation of an airbag module (e.g. module with airbag and inflator).

According to an exemplary embodiment as shown schematically in FIGS. 4A, 4B, 5, 6, 7, 8A-8D, 10A-10F, 12, 13A-13F and 14, a component C for a vehicle interior configured for deployment of an airbag assembly AA into the vehicle interior may comprise a panel assembly P and an airbag assembly AA. Panel assembly P may comprise an airbag chute CH coupled to a structural substrate S. Panel assembly P may be configured for (a) an open state with airbag chute CH accessible for assembly of airbag assembly AA (as shown schematically in FIGS. 8C, 10A, 10B, 13A and 13B) and (b) a closed state with airbag assembly AA coupled to panel assembly P (as shown schematically in FIGS. 8D, 10D-10F and 13D-13F). Component C may comprise a cover plate CV for airbag chute CH configured to support airbag assembly AA. Cover plate CV may be configured for (a) an unassembled state in the open state of panel assembly P (as shown schematically in FIGS. 8C, 10C and 13C); (b) an assembled state in the closed state of panel assembly P (as shown schematically in FIGS. 8D, 10D-10F and 13D-13F). Cover plate CV may be configured to position airbag assembly AA between cover plate CV and structural substrate S. Cover plate CV may be configured to be staked to airbag chute CH. Airbag AA may be coupled between cover plate CV and airbag chute CH. As shown schematically in FIGS. 13A-13D, airbag assembly AA may comprise at least one flap FL configured to be coupled between cover plate CV and airbag chute CH. Component C may comprise an inflator IN configured to deploy airbag assembly AA. Inflator IN may be configured to couple airbag assembly AA and cover plate CV as shown schematically in FIGS. 10E-10F. Airbag assembly AA may comprise a retainer R coupled to an airbag component AB. Component C may comprise an inflator IN configured to deploy airbag component AB. Cover plate CV may be coupled between inflator IN and airbag component AB. Airbag component AB may be coupled between cover plate CV and retainer R. Airbag assembly AA may comprise a fastener F configured to couple retainer R to airbag component AB. Fastener F may be configured to couple inflator IN to cover plate CV. Fastener F may be configured to couple inflator IN to airbag assembly AA. Fastener F may be configured to couple cover plate CV between inflator IN and airbag assembly AA. Component C may comprise a closure CS configured to secure inflator IN to cover plate CV. Component C may comprise a closure CS configured to secure inflator IN to airbag assembly AA. Component C may comprise a closure CS configured to secure cover plate CV between inflator IN and airbag assembly AA. Component C may comprise a nut; fastener F may comprise a stud. The nut may comprise a set of nuts; the stud may comprise a set of studs. Airbag component AB may comprise a hole; cover plate CV may comprise a hole; inflator IN may comprise a hole; the stud may be configured to extend through the hole of airbag component AB; the stud may be configured to extend through the hole of cover plate CV; the stud may be configured to extend through the hole of inflator IN. The nut may be configured to clamp cover plate CV between inflator IN and airbag assembly AA. Component C may comprise an inflator IN configured to deploy airbag assembly AA; cover plate CV may be configured to couple airbag assembly AA to airbag chute CH. Inflator IN may be coupled to cover plate CV; inflator IN may be indirectly coupled to airbag assembly AA by cover plate CV as shown schematically in FIGS. 13E-13F. Component C may comprise at least one of (a) a trim component; (b) an instrument panel; (c) a door panel.

According to an exemplary embodiment as shown schematically in FIGS. 4A, 4B, 5, 6, 8A-8D, 9, 10A-10F, 13A-13F and 15, a method of producing an instrument panel assembly (shown as component C) configured for an airbag assembly AA actuated by an inflator IN may comprise the steps of forming a substrate S for the instrument panel, providing a housing for airbag assembly AA on the substrate of the instrument panel and providing a cover plate CV for the housing. The housing may comprise a chute CH for airbag assembly AA. Cover plate CV may be configured for attachment of airbag assembly AA to cover plate CV so that the instrument panel assembly may comprise the instrument panel with the housing attached to substrate S and airbag assembly AA attached to cover plate CV. The method may comprise the step of assembling airbag assembly AA by providing airbag assembly AA within chute CH of the housing and attaching cover plate CV to the housing and attaching inflator IN to cover plate CV. Airbag assembly AA may be attached to the housing by cover plate CV. Airbag assembly AA may be enclosed by cover plate CV. Airbag assembly AA may be assembled by attachment of inflator IN to cover plate CV. Airbag assembly AA may be assembled by attachment of a retainer R of airbag assembly AA to inflator IN. The housing may comprise an injection molded structure. Airbag assembly AA may comprise an airbag component AB and a retainer R. Retainer R may be configured to attach inflator IN to the housing. Retainer R may be configured to attach inflator IN to airbag component AB. Retainer R may be configured to attach to cover plate CV by a set of fasteners shown as closures CS. Airbag assembly AA may comprise a set of posts shown as fasteners F; the set of fasteners/closures CS may be configured for attachment to the set of posts/fasteners F to attach airbag assembly AA to cover plate CV. Cover plate CV may comprise a set of apertures for the set of posts/fasteners F of airbag assembly AA. The set of posts/fasteners F may comprise a set of threaded posts and the set of fasteners/closures CS may comprise a set of threaded fasteners. Airbag assembly AA may comprise a set of posts configured for attachment to the housing. The set of posts may comprise a set of threaded posts. Airbag assembly AA may comprise a set of fasteners configured for attachment to the set of threaded posts. Each fastener of the set of fasteners may be configured for attachment to a post of the set of threaded posts so that airbag assembly AA is attached to the housing. The method may comprise the step of attaching airbag assembly AA to the housing with a set of fasteners. The set of fasteners may comprise a set of threaded fasteners. Airbag assembly AA may comprise a set of threaded posts. The set of threaded posts may comprise a set of bolts. The set of threaded posts may comprise a set of studs. The set of fasteners may be configured for attachment to the set of threaded posts. The set of fasteners may comprise a set of nuts. Forming the substrate for the instrument panel may comprise molding a structural substrate S. Providing the housing for airbag assembly AA on the substrate of the instrument panel may comprise attaching the housing to the substrate of the instrument panel. The housing may comprise a molded structure comprising chute CH for airbag assembly AA. The housing may be molded to the substrate.

According to an exemplary embodiment as shown schematically in FIGS. 4A, 4B, 5, 6, 7, 8A-8D, 10A-10F, 12, 13A-13F and 14, an instrument panel assembly (shown as component C) may comprise an airbag assembly AA configured for actuation by an inflator IN, an instrument panel comprising a substrate, a housing for airbag assembly AA coupled to the substrate of the instrument panel and a cover plate CV for the housing. The housing may comprise a chute CH for airbag assembly AA. Cover plate CV may be configured to be attached to the housing for attachment of airbag assembly AA to the housing so that airbag assembly AA is attached to the housing at cover plate CV. Cover plate CV may be configured to support airbag assembly AA. Airbag assembly AA may be enclosed by cover plate CV. Airbag assembly AA may be assembled by attachment of cover plate CV to chute CH. Airbag assembly AA may be assembled by attachment of a retainer R to cover plate CV. Airbag assembly AA may comprise a retainer R. Retainer R may be configured to attach airbag assembly AA to the housing. Cover plate CV may be configured to position airbag assembly AA between cover plate CV and the substrate. Airbag assembly AA may be coupled between cover plate CV and chute CH. The instrument panel assembly may comprise an inflator IN configured to deploy airbag assembly AA; inflator IN may be coupled to cover plate CV; inflator IN may be indirectly coupled to airbag assembly AA by cover plate CV.

According to an exemplary embodiment as shown schematically in FIG. 9, a method of producing an instrument panel assembly may comprise the steps of providing a structural substrate with an airbag chute, assembling a retainer, an airbag component and a fastener, assembling a cover plate between an inflator and the retainer/airbag component/fastener, assembling the inflator/retainer/airbag component/fastener to the structural substrate with airbag chute, and finishing/providing the panel assembly (with the airbag and the inflator).

According to an exemplary embodiment as shown schematically in FIG. 11, a method of producing an instrument panel assembly may comprise the steps of providing a structural substrate (e.g. molding or forming a panel), providing an air bag door(s) (e.g. molding a door), assembling the air bag door(s) to the structural substrate (e.g. welding or bonding), providing a chute (e.g. molding a chute), assembling the chute to the structural substrate (e.g. welding or bonding), providing an airbag component (e.g. cutting and sewing fabric), providing a retainer (e.g. stamping steel in a shape), providing a set of fasteners (e.g. studs, posts), assembling the retainer, airbag component and fasteners, placing the airbag in the chute, providing a cover plate (e.g. molding or forming), assembling the cover plate to the chute to enclose the airbag, assembling an inflator to the airbag fasteners/retainer and finishing/providing the panel assembly (with the airbag and the inflator).

Figure 15:
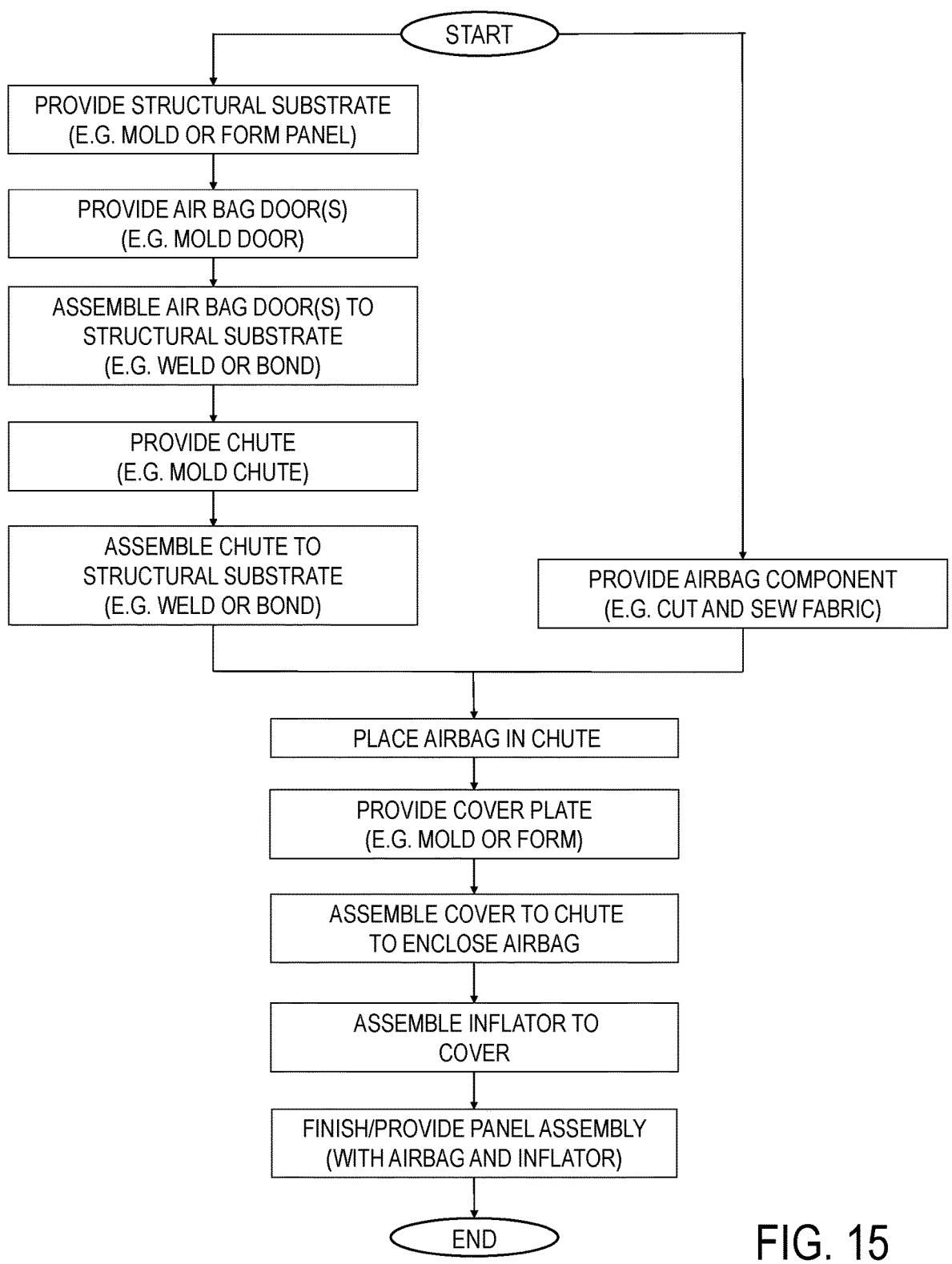
FIG. 15 is a schematic flow diagram of a method for forming a vehicle interior component according to an exemplary embodiment.
Figure 16A:
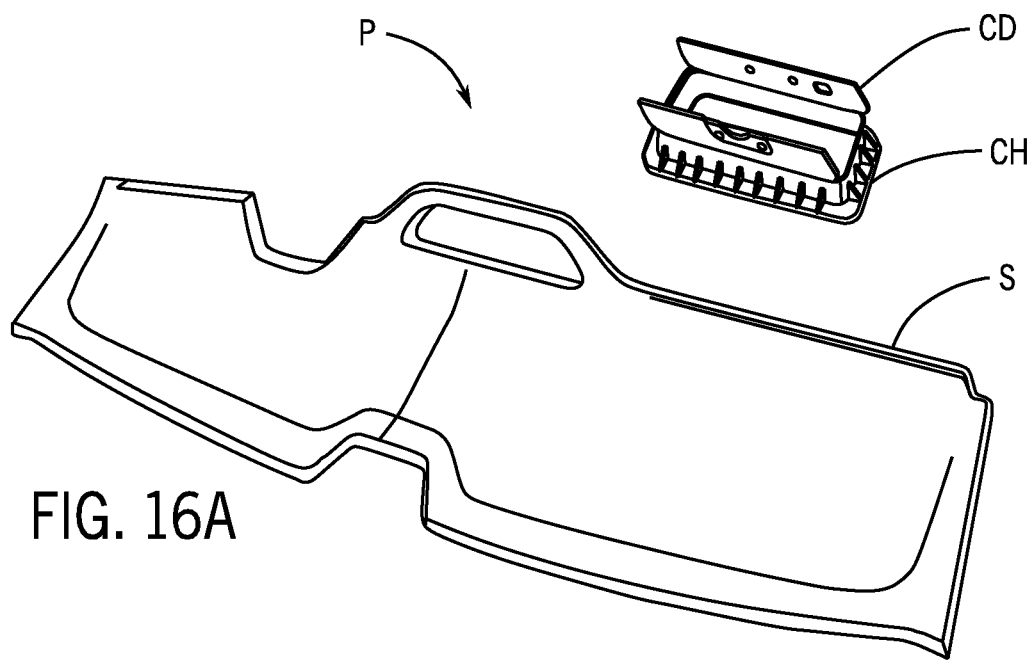
FIGS. 16A and 16B are schematic partial perspective views of a method for forming a vehicle interior component according to an exemplary embodiment.
Figure 16B:
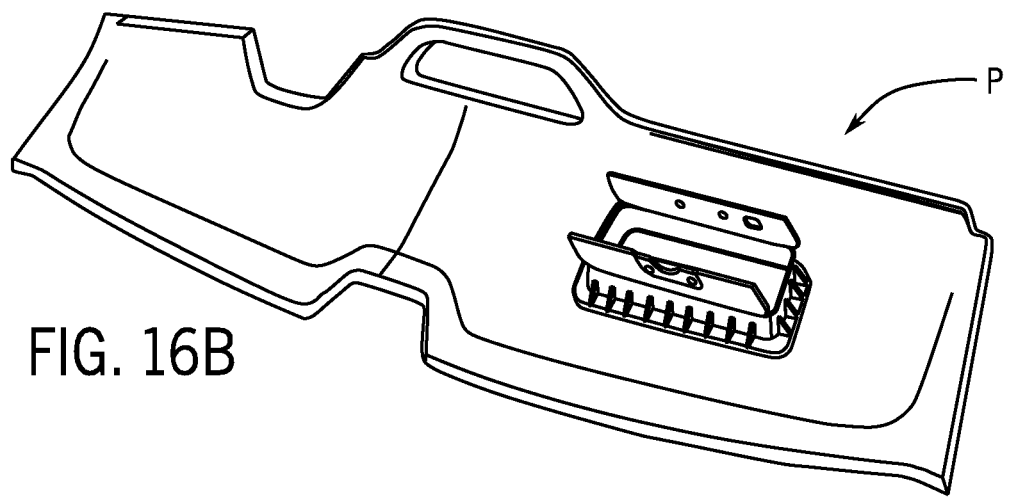
Figure 17:
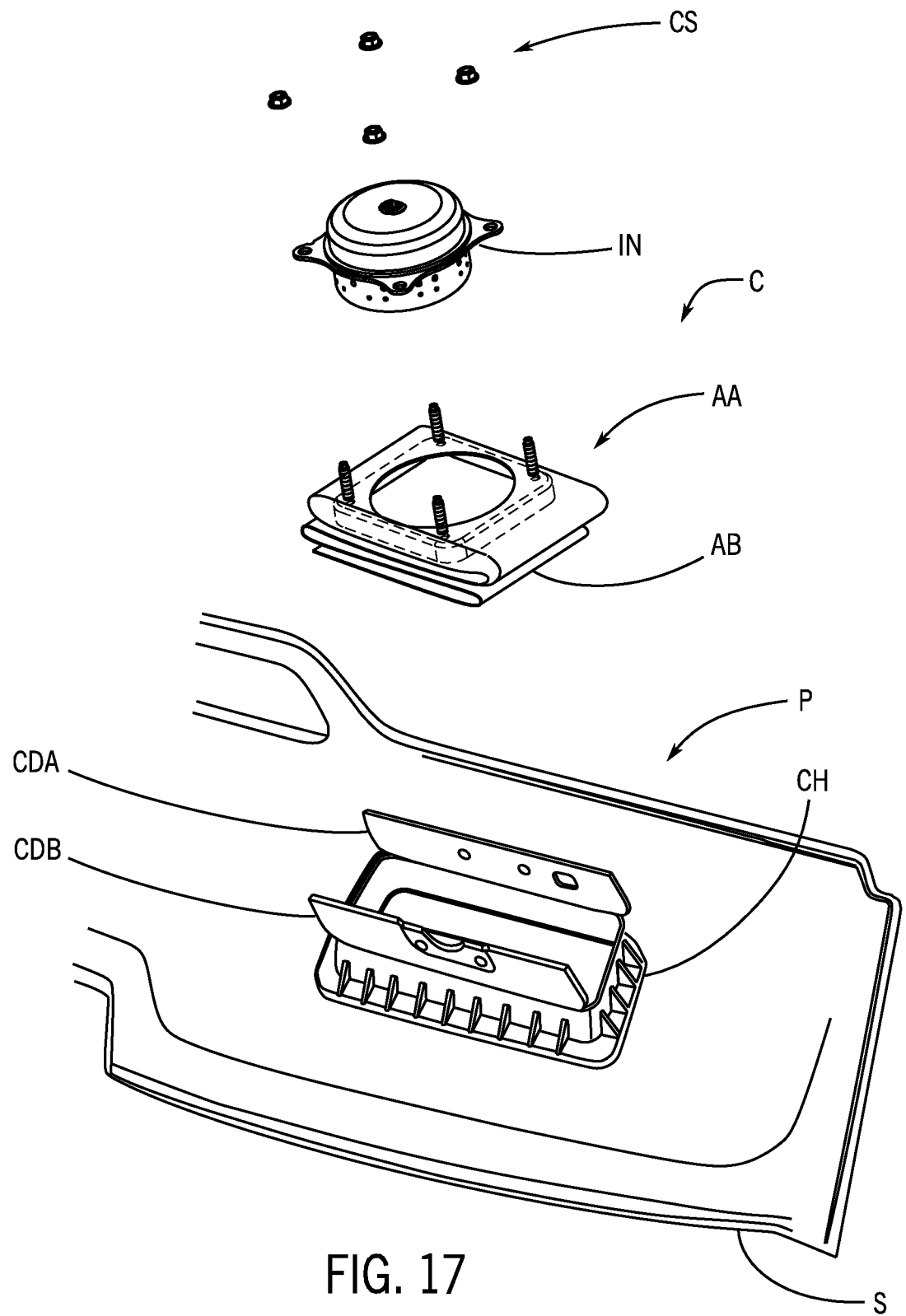
FIG. 17 is a schematic partial exploded perspective view of a vehicle interior component according to an exemplary embodiment.

According to an exemplary embodiment as shown schematically in FIG. 15, a method of producing an instrument panel assembly may comprise the steps of providing a structural substrate (e.g. molding or forming a panel), providing an air bag door(s) (e.g. molding a door), assembling the air bag door(s) to the structural substrate (e.g. welding or bonding), providing a chute (e.g. molding a chute), assembling the chute to the structural substrate (e.g. welding or bonding), providing an airbag component (e.g. cutting and sewing fabric), placing the airbag in the chute, providing a cover plate (e.g. molding or forming), assembling the cover plate to the chute to enclose the airbag, assembling an inflator to the cover plate and finishing/providing the panel assembly (with the airbag and the inflator).

As shown schematically according to an exemplary embodiment in FIGS. 2A-2D, 7, 10 and 12, the vehicle interior component may comprise a panel assembly P integrated with an airbag assembly AA (e.g. configured for integration/assembly of the airbag). The vehicle interior component may comprise a panel assembly such as a trim panel, instrument panel, etc.

As shown schematically according to an exemplary embodiment in FIGS. 4A, 4B, 5, 6, 7, 8A-8D, 10A-10F, 12, 13A-13F and 14, a vehicle interior component such as a panel assembly may comprise a housing for an airbag. As shown schematically according to an exemplary embodiment in FIGS. 9, 11 and 15, a method of producing a panel assembly may provide an integrated airbag.

As shown schematically according to an exemplary embodiment in FIGS. 2A-2D, 8A-8D, 10A-10F and 13A-13F, a component for a vehicle interior configured for deployment of an airbag into the vehicle interior may comprise a panel assembly such as a trim panel assembly with an airbag.

As indicated schematically according to an exemplary embodiment in FIGS. 4A, 4B, 6, 7, 8A-8D, 10A-10F, 12, 13A-13F and 14, a panel assembly P such as a trim panel assembly may comprise an airbag assembly AA actuated by an inflator IN; the panel may comprise a substrate S and a housing CH/CD. As shown schematically according to an exemplary embodiment in FIGS. 22A-22B, the housing may comprise a chute CH for the airbag and a door CD for the airbag. As shown schematically according to an exemplary embodiment in FIG. 8D, 10D and 13D, airbag assembly AA may be attached to the housing by cover plate CV. As shown schematically according to an exemplary embodiment in FIGS. 13B-13D, airbag assembly AA may be attached to the housing by cover plate CV; a flap FL of airbag assembly AA may be clamped between cover plate CV and the housing.

Exemplary Embodiments—B

As shown schematically according to an exemplary embodiment in FIGS. 1A-1B, a vehicle V may comprise an interior I with interior components such as a door D with door panel, console such as a floor console FC, panel such as trim/instrument panel IP. As shown schematically in FIGS. 2A-2B, the component may comprise a trim panel shown as an instrument panel IP configured with an airbag door ABD to deploy an airbag AB from an airbag module (installed behind the instrument panel IP). See also FIGS. 19A-19B.

As shown schematically according to an exemplary embodiment in FIGS. 2A-2B, 4A-4B, 16A-16B and 17, a panel assembly P such as a trim/instrument panel may a base shown as substrate S with a housing shown as comprising a chute CH and with flaps shown as doors CD configured for installation of an airbag module shown as airbag assembly AA; housing shown as chute with doors CH/CD may be attached to the substrate S of the panel; the airbag assembly AA comprising an airbag AB with inflator IN and a retainer R may be installed into the housing/chute CH of the panel assembly P with a fastener arrangements with fasteners shown as threaded posts F and threaded nuts CS. See also FIGS. 18A-18E and 19A-19B.

As shown schematically according to an exemplary embodiment in FIGS. 2A-2D and 19A-19B, the vehicle interior component may comprise a panel assembly P integrated with an airbag assembly AA (e.g. configured for integration/assembly of the airbag assembly). See also FIGS. 19A-19B, 20A-20C and 21. The vehicle interior component may comprise a panel assembly such as a trim panel, instrument panel, etc.

As shown schematically according to an exemplary embodiment in FIGS. 4A-4B, 16A-16B, 17, 18A-18E and 19A-19B, a vehicle interior component such as a panel assembly may comprise a housing for an airbag assembly. As shown schematically according to an exemplary embodiment in FIGS. 20A-20C and 21, a method of producing a panel assembly my provide an integrated airbag assembly.

As shown schematically according to an exemplary embodiment in FIGS. 2A-2C and 18A-18E, a component for a vehicle interior configured for deployment of an airbag into the vehicle interior may comprise a panel assembly such as a trim panel assembly with an airbag assembly.

As indicated schematically according to an exemplary embodiment in FIGS. 2A-2C, 4A-4B, 16A-16B, 17, 18A-18E and 19A-19B, a panel assembly P such as a trim panel assembly may comprise an airbag assembly AA with an airbag ABD actuated by an inflator IN; the panel may comprise a substrate S and a housing CH/CD. As shown schematically according to an exemplary embodiment in FIGS. 18A-18E and 19A-19B, the housing may comprise a chute CH for the airbag and a set of flaps CD; the set of flaps of the housing may be configured to be folded for attachment of the airbag assembly to the housing; the airbag assembly may be attached to the housing at the set of flaps.

As shown schematically according to an exemplary embodiment in FIGS. 4A-4B, 16A-16B, 17, 18A-18E and 19A-19B, a panel assembly P such as an instrument panel assembly may comprise an airbag assembly may comprise an airbag actuated by an inflator and an instrument panel may comprise a substrate and a housing for the airbag assembly coupled to the substrate of the instrument panel. See also FIGS. 1B and 2A-2B. The housing may comprise a chute CH for the airbag and a set of flaps CD; the set of flaps of the housing may be configured to be folded for attachment of the airbag assembly to the housing; the airbag assembly may be attached to the housing at the set of flaps.

As shown schematically according to an exemplary embodiment in FIGS. 18A-18E and 19A-19B, the airbag may be attached to the housing by the set of flaps. The airbag of the airbag assembly may be enclosed by the set of flaps of the housing. The airbag assembly may be assembled by attachment of the inflator to the set of flaps of the housing. The airbag assembly may be assembled by attachment of a retainer of the set of flaps of the housing.

As shown schematically according to an exemplary embodiment in FIGS. 4A-4B, 17, 18A-18E and 19A-19B the airbag assembly AA may comprise a retainer R; the retainer may be configured to attach the airbag assembly to the set of flaps CD.

As shown schematically according to an exemplary embodiment in FIGS. 18A-18E and 19A-19B, the housing may comprise a set of hinges shown for the set of flaps CD; each hinge of the set of hinges may comprise a living hinge LH. The housing may comprise a molded structure with the set of flaps and the set of hinges. See e.g. FIGS. 17, 18A-18E, 19A-19B, 20A-20C and 21. The housing CH/CD may comprise an injection molded structure. Assembly of the airbag assembly AA to the housing may further comprise the step of folding each flap CD of the set of flaps of the housing for attachment of the airbag assembly. See FIGS. 18A-18E, 19A-19B, 20A-20C and 21.

As shown schematically according to an exemplary embodiment in FIGS. 2A-2C, 4A-4B, 16A-16B, 17, 18A-18E and 19A-19B, the set of flaps may comprise a set of doors. The set of doors may be configured to be closed to retain the airbag within the chute. The airbag assembly may be configured to be secured to the housing by attachment to the set of doors of the housing.

Figure 19A:
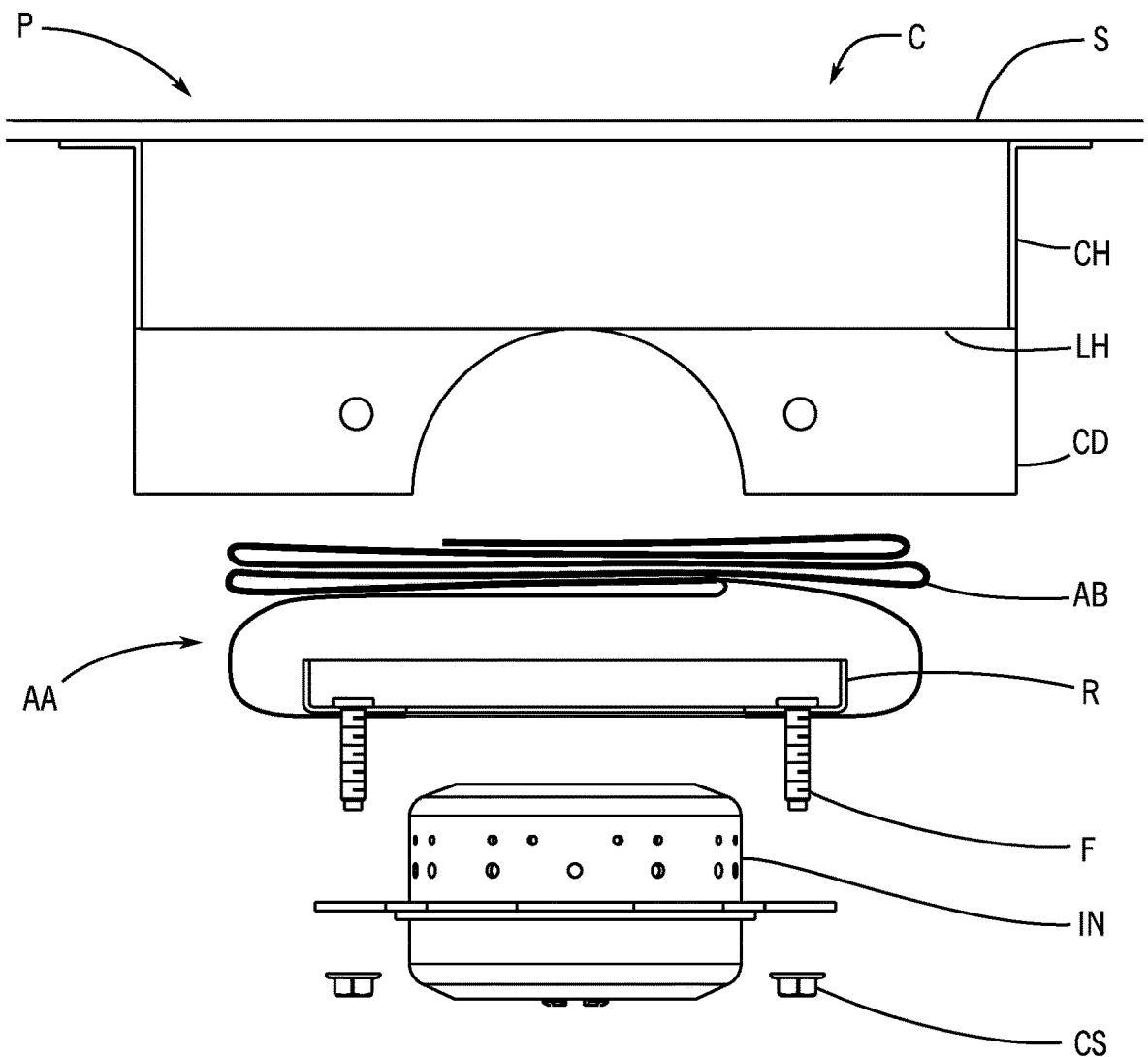
FIG. 19A is a schematic partial exploded section view of a vehicle interior component according to an exemplary embodiment.
Figure 19B:
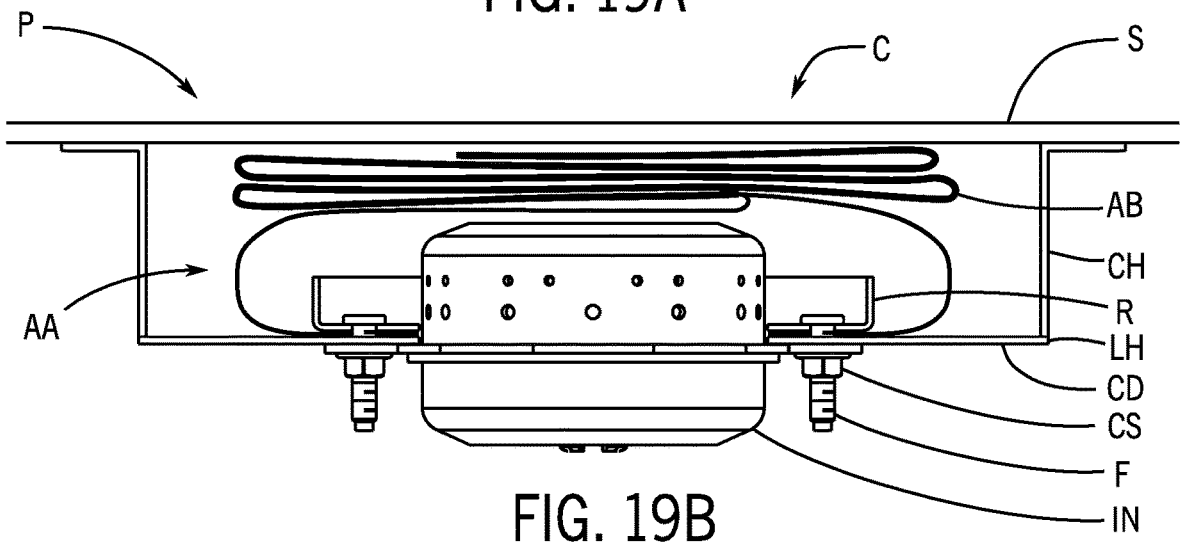
FIG. 19B is a schematic partial section view of a vehicle interior component according to an exemplary embodiment.

As shown schematically according to an exemplary embodiment in FIGS. 4A-4B, 16A-16B, 17, 18A-18E and 19A-19B, a component for a vehicle interior configured for deployment of an airbag into the vehicle interior may comprise a panel assembly and an airbag assembly. The panel assembly may comprise an airbag chute coupled to a structural substrate;

As shown schematically according to an exemplary embodiment in FIGS. 19A-19B, the panel assembly may be configured for an open state with the airbag chute accessible for assembly of the airbag (FIG. 19A) and a closed state with the airbag assembly coupled to the panel assembly (FIG. 19B). The airbag chute may comprise a door configured to support the airbag. See FIGS. 18E and 19B.

As shown schematically according to an exemplary embodiment in FIGS. 17, 18A-18E and 19A-19B, the flap may comprise a door; the door may be configured for an open position in the open state of the panel assembly and a closed position in the closed state of the panel assembly; the door may be configured to position the airbag between the door and the structural substrate S; the structural substrate may comprise a door configured to open to facilitate deployment of the airbag; the door of the airbag chute may be configured to remain in a closed position during deployment of the airbag. See also FIGS. 2A-2B and 16A-16B. The door may comprise a set of doors.

As shown schematically according to an exemplary embodiment in FIGS. 2A-2B, 17, 18E and 19A-19B, the airbag assembly may further comprise an inflator IN configured to deploy the airbag; the set of doors may comprise a first door CDA and a second door CDB; the inflator IN may be configured to couple the first door CDA and the second door CDB; the airbag assembly may comprise a retainer R coupled to an airbag AB (e.g. with fasteners CS).

As shown schematically according to an exemplary embodiment in FIGS. 18A-18E and 19A-19B, the airbag chute CH of the housing may be coupled between the inflator IN and the airbag AB; the airbag AB may be coupled between the inflator IN and the retainer R; the airbag assembly may comprise a fastener arrangement configured to couple the retainer to the airbag. A set of fasteners may be configured to couple the inflator to the airbag chute; the fastener may be configured to couple the inflator to the airbag assembly; the fastener may be configured to couple the airbag chute between the inflator and the airbag assembly. As indicate schematically in FIGS. 18A-18E and 19A-19B, the flaps/doors CD may comprise a closure configured to secure the inflator IN to the airbag chute CH of the housing. The assembly may further comprise a closure configured to secure the inflator to the airbag assembly; the assembly may further comprise a closure configured to secure the airbag chute between the inflator and the airbag assembly. The fastener arrangement may comprise a nut; the fastener may comprise a stud; the nut may comprise a set of nuts; the stud may comprise a set of studs.

As shown schematically according to an exemplary embodiment in FIGS. 4A-4B, 16A-16B, 17, 18A-18E and 19A-19B, the airbag may comprise a hole; the airbag chute may comprise a hole; the inflator may comprise a hole; the stud may be configured to extend through the hole of the airbag; the stud may be configured to extend through the hole of the airbag chute; the stud may be configured to extend through the hole of the inflator; the nut may be configured to clamp the airbag chute between the inflator and the airbag.

Figure 18A:
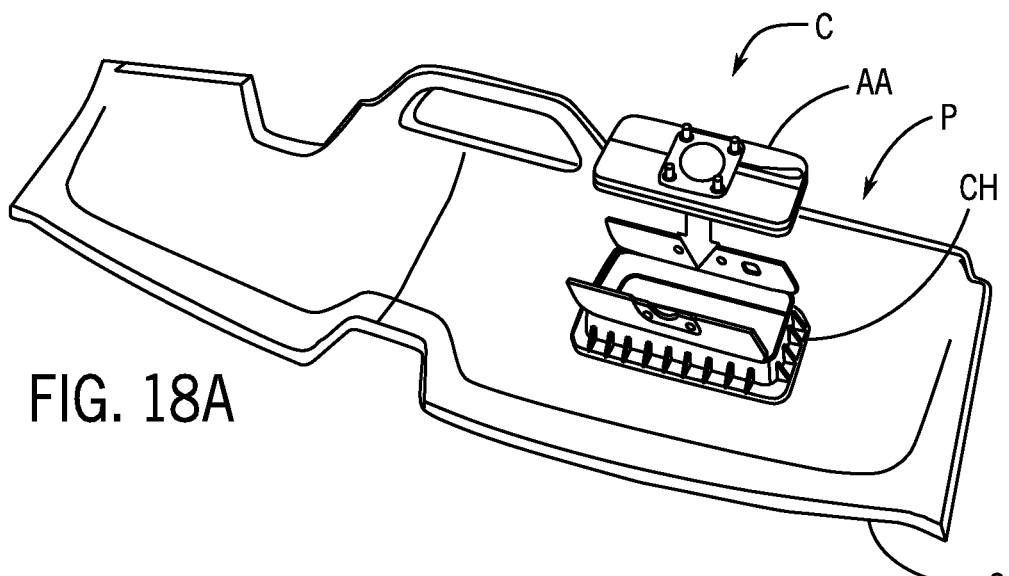
FIGS. 18A through 18E are schematic partial perspective views of a method for forming a vehicle interior component according to an exemplary embodiment.
Figure 18B:
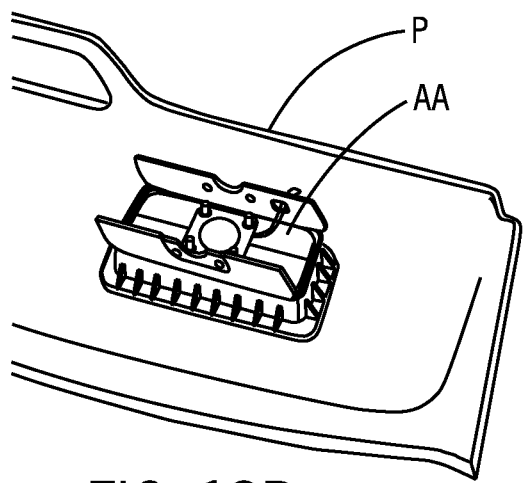
Figure 18C:
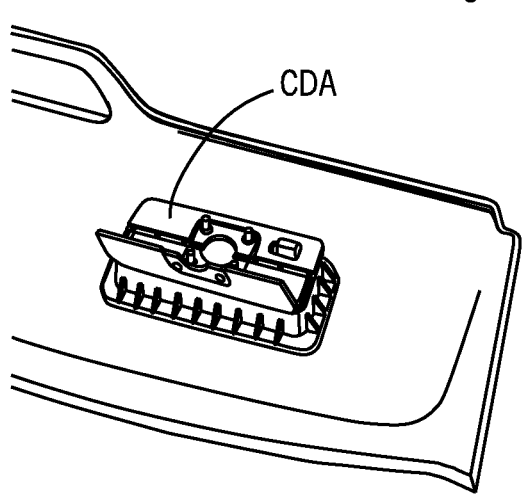
Figure 18D:
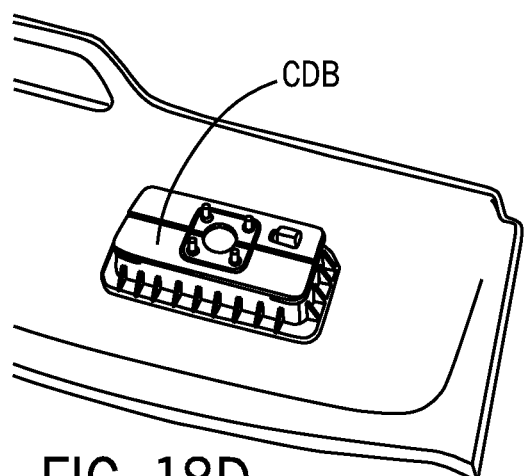
Figure 18E:
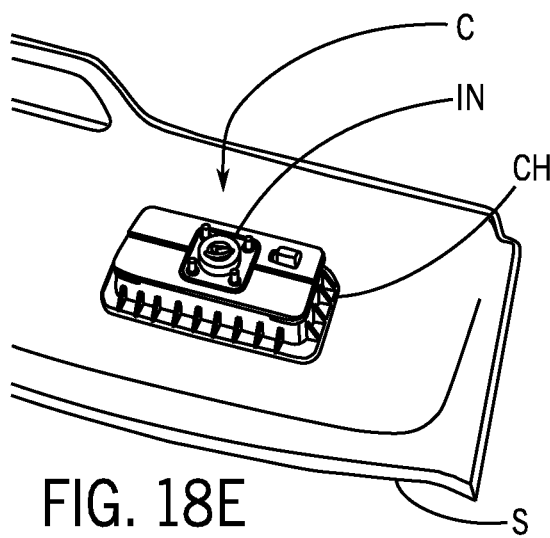

As shown schematically according to an exemplary embodiment in FIGS. 20A-20C and 21, a method of producing a trim panel assembly configured for an airbag assembly may comprise an airbag actuated by an inflator may comprise the steps of forming a substrate for the trim panel and providing a housing for the airbag assembly on the substrate of the trim panel; the housing may comprise a chute for the airbag and a set of flaps; the set of flaps may be configured to be folded for attachment of the airbag assembly to the housing; the trim panel assembly may comprise the trim panel with the housing attached to the substrate and the airbag assembly attached to the housing. See also FIGS. 17, 18A-18E and 19A-19B. As shown schematically according to an exemplary embodiment, the method may further comprise the step of assembling the airbag assembly by providing the airbag within the chute of the housing and folding the set of flaps of the housing over the airbag and attaching the inflator to the set of flaps of the housing. According to an exemplary embodiment as shown in FIGS. 18A-18B, the trim panel assembly may comprise an instrument panel assembly.

As shown schematically according to an exemplary embodiment in FIGS. 20A-20C and 21, a method of producing an instrument panel assembly configured for an airbag assembly may comprise an airbag actuated by an inflator may comprise the steps of forming a substrate for the instrument panel and providing a housing for the airbag assembly on the substrate of the instrument panel. The housing may comprise a chute for the airbag and a set of flaps; the set of flaps may be configured to be folded for attachment of the airbag assembly to the housing; the instrument panel assembly may comprise the instrument panel with the housing attached to the substrate and the airbag assembly attached to the housing.

Figure 20A:
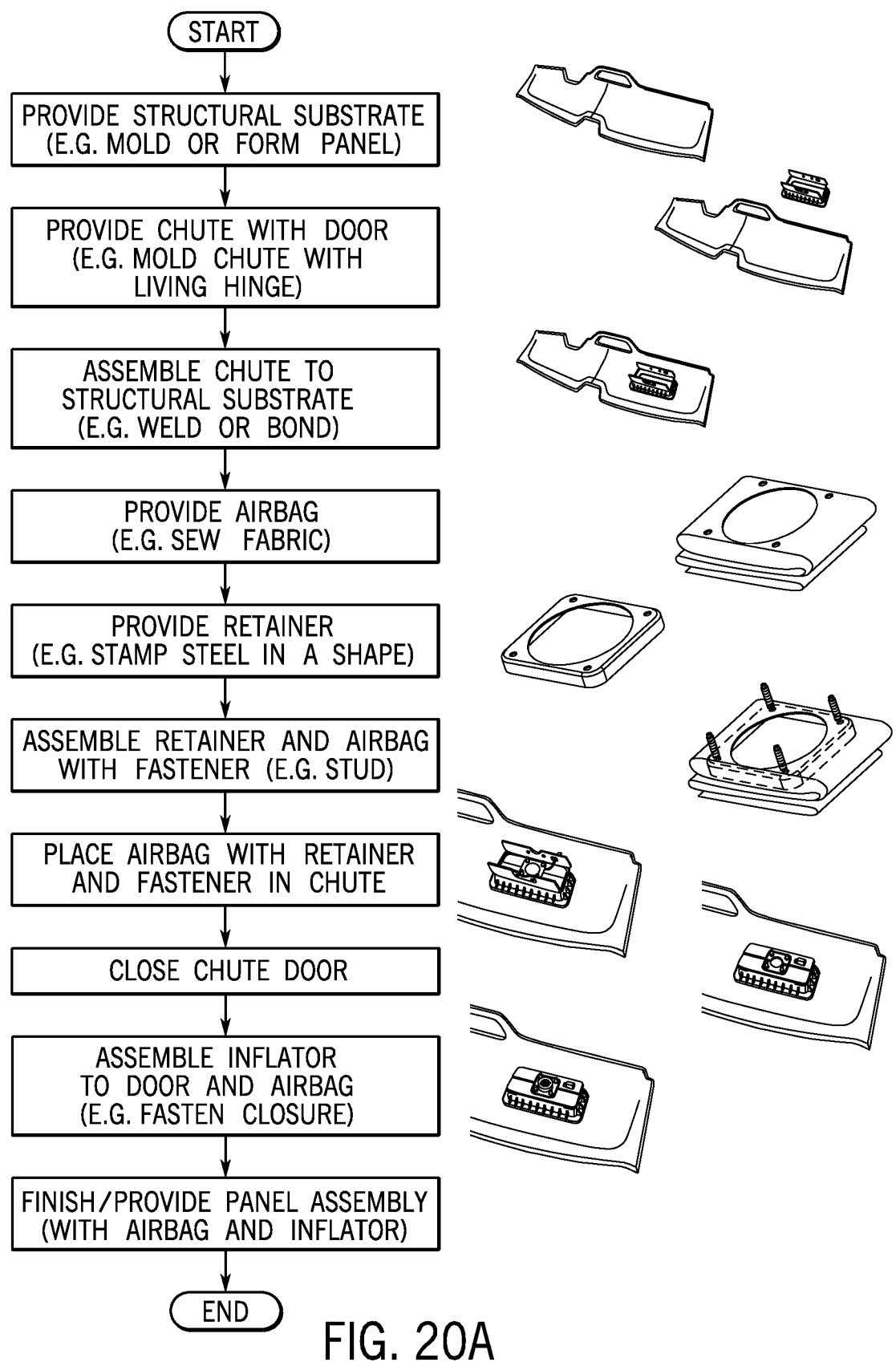
FIG. 20A is a schematic flow diagram of a method for forming a vehicle interior component according to an exemplary embodiment.
Figure 21:
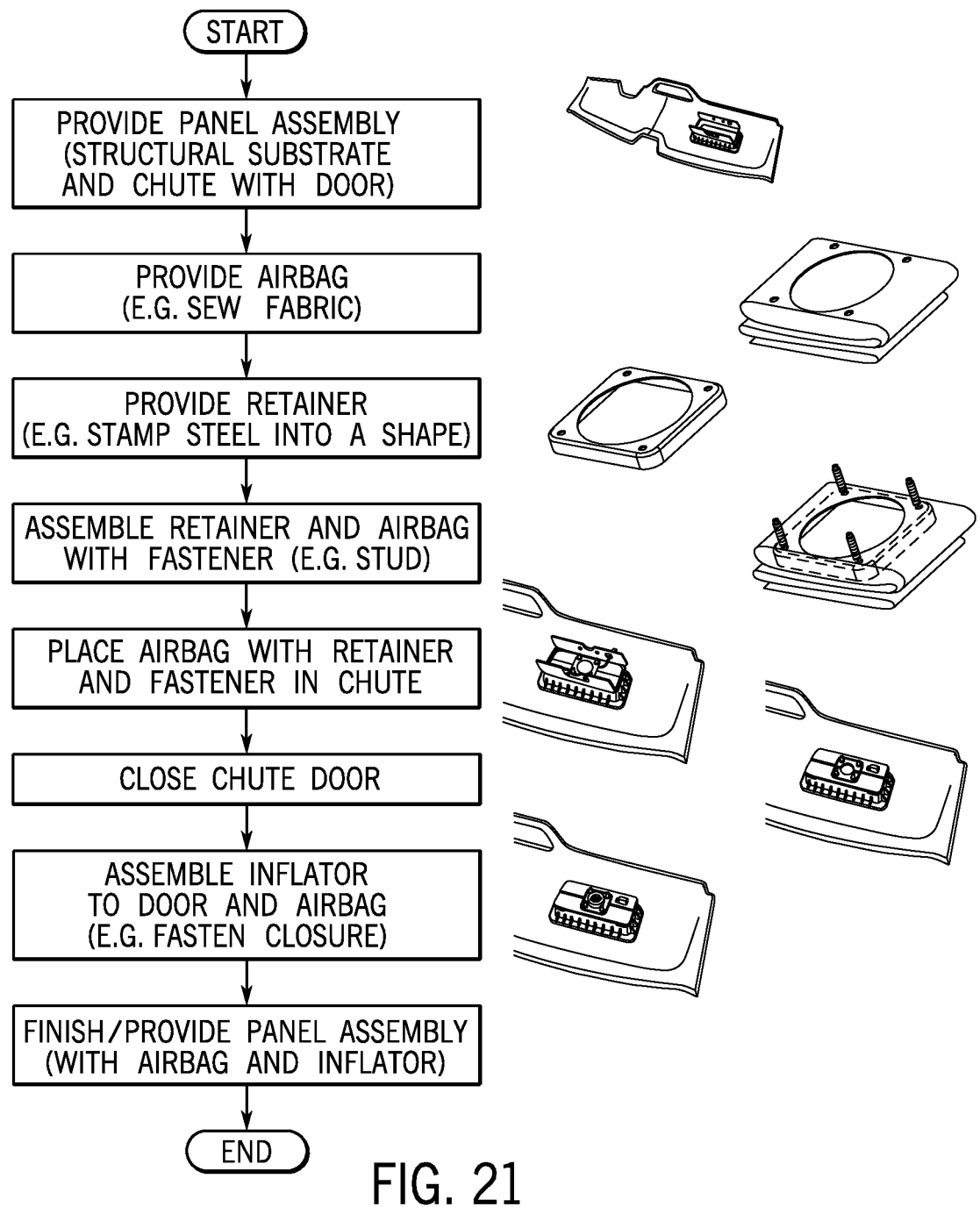
FIG. 21 is a schematic flow diagram of a method for forming a vehicle interior component according to an exemplary embodiment.
Figure 22A:
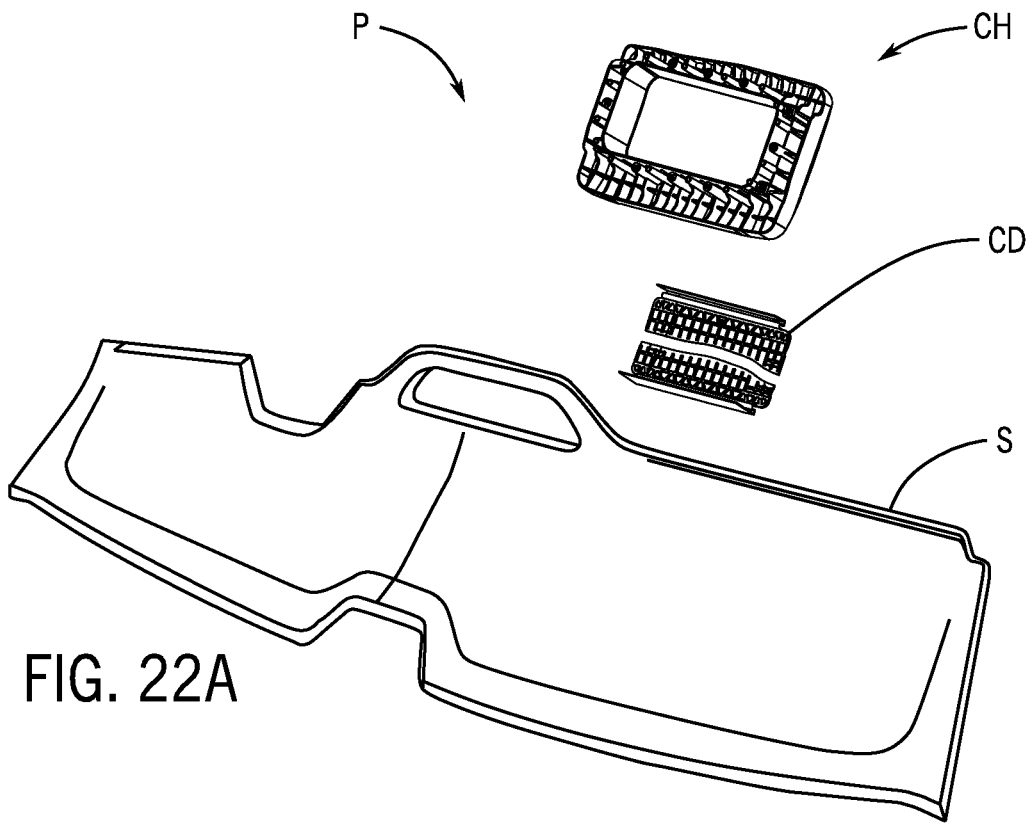
FIGS. 22A and 22B are schematic partial perspective views of a method for forming a vehicle interior component according to an exemplary embodiment.
Figure 22B:
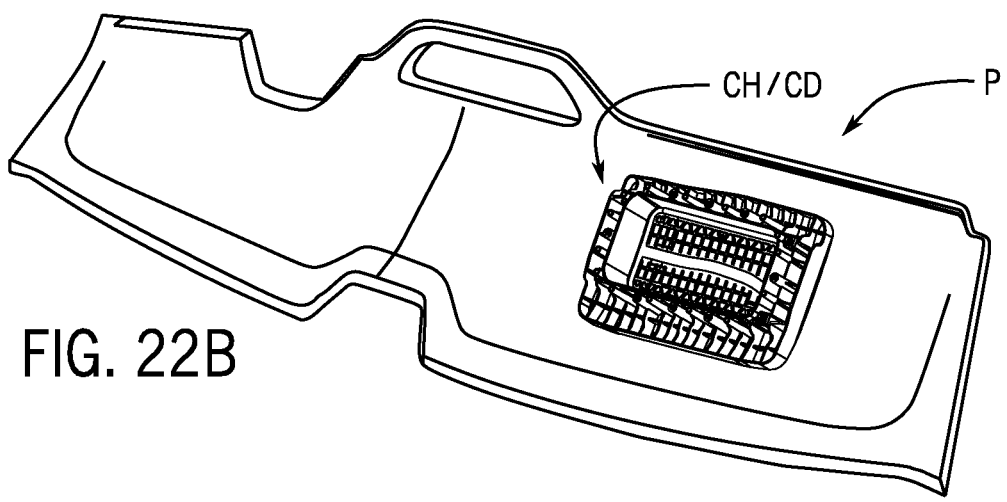

As shown schematically according to an exemplary embodiment in FIGS. 20A-20B and 21, a method may further comprise the step of assembling the airbag assembly by providing the airbag within the chute of the housing and folding the set of flaps of the housing over the airbag and attaching the inflator to the set of flaps of the housing. As shown schematically according to an exemplary embodiment in FIGS. 19A-19B, the airbag may be attached to the housing by the set of flaps. The airbag of the airbag assembly may be enclosed by the set of flaps of the housing. The airbag assembly may be assembled by attachment of the inflator to the set of flaps of the housing. The airbag assembly may be assembled by attachment of a retainer of the set of flaps of the housing. The housing may comprise a set of hinges for the set of flaps. Each hinge of the set of hinges may comprise a living hinge.

As shown schematically according to an exemplary embodiment in FIGS. 20A-20B and 21, the housing may comprise a molded structure with the set of flaps and the set of hinges. The housing may comprise an injection molded structure. The method of assembly may further comprise the step of folding each flap of the set of flaps of the housing for attachment of the airbag assembly. See also FIGS. 18A-18E and 19A-19B. As shown schematically according to an exemplary embodiment, the method may further comprise the step of attaching the airbag assembly to the housing. The step of attaching the airbag assembly may comprise attaching the airbag assembly to each flap of the set of flaps. The airbag assembly may comprise a retainer. The step of attaching the airbag assembly may comprise attaching the retainer to each flap of the set of flaps. The step of attaching the airbag assembly may comprise fastening the inflator to each flap of the set of flaps. The retainer may be configured to attach the inflator to the housing. The retainer may be configured to attach the inflator to the airbag. The retainer may be configured to attach to the housing by a set of fasteners. The airbag assembly may comprise a set of posts; the set of fasteners may be configured for attachment to the set of posts to attach the airbag assembly to the housing. The set of flaps of the housing may comprise a set of apertures for the set of posts of the airbag assembly.

As shown schematically according to an exemplary embodiment shown schematically in FIGS. 18A-18E, 19A-19B, 20A-20C and 21, the method may further comprise the step of attaching the airbag assembly to the housing. The step of attaching the airbag assembly to the housing may comprise the step of folding the set of flaps of the housing. The housing may comprise a set of hinges for the set of flaps. Each flap of the set of flaps may comprise a hinge. The hinge may be a living hinge. Each flap may be configured to be folded at the hinge. The method may further comprise the step of attaching the airbag assembly to the housing. The step of attaching the airbag assembly to the housing may comprise folding the set of flaps of the housing and securing the airbag assembly to the set of flaps of the housing on a set of posts with a set of fasteners. The set of posts may comprise a set of threaded posts and the set of fasteners may comprise a set of threaded fasteners. The airbag assembly may comprise a set of posts configured for attachment to the housing. The set of posts may comprise a set of threaded posts. The airbag assembly may comprise a set of fasteners configured for attachment to the set of threaded posts. Each fastener of the set of fasteners may be configured for attachment to a post of the set of threaded posts so that the airbag assembly may be attached to the housing. See FIGS. 18A-18E and 19A-19B.

As shown schematically according to an exemplary embodiment in FIGS. 17, 18A-18E and 20A-20C, the method may further comprise the step of attaching the airbag assembly to the housing with a set of fasteners. The set of fasteners may comprise a set of threaded fasteners. The airbag may comprise a set of threaded posts. The set of threaded posts may comprise a set of studs. The set of threaded fasteners may be configured for attachment to the set of threaded posts. The set of threaded fasteners may comprise a set of nuts. The set of threaded posts may comprise a set of bolts.

As shown schematically according to an exemplary embodiment in FIGS. 18A-18E and 19A-19B, the set of flaps CD may comprise a set of doors. The method may further comprise the step of attaching the airbag assembly to the housing may comprise assembling the airbag assembly to the set of doors of the housing with a set of fasteners; the step of attaching the airbag assembly to the housing may comprise closing the set of doors to enclose the airbag within the chute; the step of assembling the airbag assembly to the set of doors of the housing may comprise securing the inflator to the set of doors with a retainer. See FIGS. 20A-20C and 21.

As shown schematically according to an exemplary embodiment in FIGS. 20A-20C, the step of forming the substrate for the instrument panel may comprise molding a structural substrate. The step of providing the housing for the airbag assembly on the substrate of the instrument panel may comprise attaching the housing to the substrate of the instrument panel. The housing may comprise a molded structure with the chute for the airbag and the set of flaps. As shown schematically according to an exemplary embodiment in FIG. 21, the housing may be molded to the substrate; the set of flaps may be configured to be folded for attachment of the airbag assembly to the housing.

As shown schematically in FIGS. 23A-23B, a conventional panel assembly CX such as a trim/instrument panel may a base shown as substrate SX with a housing CHX shown as comprising a chute configured for installation of an airbag module AMX (e.g. module with airbag and inflator).

Exemplary Embodiments—C

According to an exemplary embodiment as shown schematically in FIGS. 2A-2D, 12, 13A-13F, 14 and 15, a component for a vehicle interior may comprise a panel comprising a structure, and an airbag comprising a cushion configured for deployment through the panel into the vehicle interior. The airbag may be coupled to the structure. The airbag may be configured for direct attachment to the structure. The airbag may comprise a base section comprising a set of features configured for attachment of the airbag to the structure; the set of features may comprise a set of holes. The airbag may comprise a set of flaps; the set of flaps may comprise the set of holes. The structure may comprise an airbag chute. The structure may comprise a set of features configured for attachment of the airbag to the structure. The set of features of the structure may comprise a set of posts; the airbag may comprise a set of holes for attachment of the airbag to the structure. The set of features of the structure may comprise a set of posts; the airbag may comprise a flap comprising a set of holes configured to engage the set of posts of the structure. The component may comprise a cover coupled to the structure; the structure may be configured to provide a compartment for the airbag; the airbag may be configured for deployment from the compartment through the panel into the vehicle interior. The component may comprise an inflator configured to inflate the cushion of the airbag for deployment into the vehicle interior; the inflator may be coupled to the cover. The cover may comprise a molded cover plate. The cover may be configured to clamp the airbag between the cover and the structure. The airbag may comprise at least one flap coupled between the cover and the structure. The component may comprise an inflator configured to inflate the airbag; the inflator may be assembled to the cover. The cover may comprise a set of features configured for attachment of the cover to the structure; the set of features of the cover may comprise a set of holes configured to engage a set of posts of the structure. The cover may be staked to the structure. The structure may comprise a frame configured for attachment of the airbag to the structure and attachment of a cover to the structure. The component may comprise at least one of (a) a trim component; (b) an instrument panel; (c) a door panel.

According to an exemplary embodiment as shown schematically in FIGS. 2A-2D, 12, 13A-13F, 14 and 15, a component for a vehicle interior configured for deployment of an airbag into the vehicle interior may be produced by a process comprising the steps of providing a panel assembly comprising a structural substrate and an airbag chute configured to facilitate deployment of the airbag, providing the airbag within the airbag chute, and assembling a cover plate to the panel assembly with the airbag. The cover plate and the panel assembly may be configured to provide a compartment for the airbag. The step of providing the airbag within the airbag chute may comprise coupling at least one flap of the airbag between the cover plate and the airbag chute. The step of assembling a cover plate to the panel assembly with the airbag may comprise staking the cover plate to the airbag chute to clamp the airbag between the cover plate and the airbag chute.

According to an exemplary embodiment as shown schematically in the FIGURES, a component for a vehicle interior may comprise a panel comprising a structure, and an airbag comprising a cushion configured for deployment through the panel into the vehicle interior. The airbag may be coupled to the structure. The airbag may be configured for attachment to the structure. The airbag may be configured for direct attachment to the structure. The airbag may comprise a base section comprising a set of features configured for attachment of the airbag to the structure. The set of features may comprise a set of holes. The airbag may comprise a set of flaps; the set of flaps may comprise the set of features. The structure may comprise an airbag chute. The structure may comprise a cover. The structure may comprise a composite structure comprising an airbag chute and a cover. The structure may comprise a set of features configured for attachment of the airbag to the structure. The set of features of the structure may comprise at least one of (a) a set of holes and (b) a set of posts. The set of features of the structure may comprise a set of posts; the set of features of the airbag may comprise a set of holes. The set of features of the structure may comprise a set of posts; the set of features of the airbag may comprise a set of flaps comprising a set of holes for the set of posts of the structure. The set of features of the structure may comprise a set of posts; the set of features of the airbag may comprise a set of flaps comprising a set of holes configured to engage the set of posts of the structure. The structure may be configured to provide a compartment for the airbag; the airbag may be configured for deployment from the compartment through the panel into the vehicle interior. The component may comprise a cover for the structure. The component may comprise a cover for the compartment. The cover may be coupled to the structure. The airbag may be directly coupled to the structure. The airbag may be coupled to the cover. The cover may comprise a set of features configured for attachment of the cover to the structure. The set of features of the cover may comprise a set of holes. The set of features of the structure may comprise a set of posts; the set of features of the cover may comprise a set of holes. The set of features of the structure may comprise a set of posts; the set of features of the cover may comprise a set of holes configured to engage the set of posts of the structure. The component may comprise an inflator configured to inflate the cushion of the airbag for deployment into the vehicle interior. The inflator may be coupled to the structure. The inflator may be configured to be attached to the structure. The component may comprise a cover for the structure; the inflator may be coupled to the cover. The cover may comprise a set of features configured for attachment of the inflator to the cover. The inflator may comprise a set of features configured for attachment of the inflator to the cover. The set of features of the inflator may comprise a set of holes. The inflator may be coupled to the cover with a set of fasteners. The set of features of the inflator may comprise a set of holes for the set of fasteners. The cover may be attached to the structure by staking. The cover may be staked to the structure. The structure may comprise an airbag chute; the airbag may comprise at least one flap coupled to the airbag chute. The structure may comprise a frame configured for attachment of the airbag to the structure. The frame of the structure may be configured for attachment of a cover to the structure. The structure may comprise a frame configured for attachment of a cover to the structure. The cover may comprise an interface configured for attachment of an inflator to the cover; the interface of the cover may comprise a hole to connect the inflator with the airbag. The component may comprise a cover; the cover may comprise a cover plate configured for attachment to the structure. The structure may comprise a housing. The structure may comprise a set of features configured for attachment of the cover plate to the structure. The panel may comprise a substrate. The panel may comprise a structural substrate. The structure may be configured to be attached directly to the panel. The cushion of the airbag may be configured to form an airbag door in the panel when inflated from the compartment for deployment through the panel into the vehicle interior. The component may comprise a panel assembly comprising the panel and the structure. The panel may comprise a structural substrate; the structure may comprise an airbag chute. The component may comprise a cover coupled to the panel assembly; the cover and the panel assembly may be configured to provide a compartment for the airbag. The airbag may comprise at least one flap coupled to the airbag chute. The cover may comprise a cover plate. The cover may comprise a molded cover plate. The cover may be staked to the airbag chute. The airbag may be clamped between the cover and the airbag chute. The airbag may be coupled between the cover and the airbag chute. The cover may be configured to clamp the airbag between the cover and the airbag chute. The airbag chute may comprise a post; the at least one flap may comprise a hole coupled to the post. The at least one flap may be coupled between the cover and the airbag chute. The component may comprise an inflator configured to inflate the airbag; the inflator may be assembled to the cover. The cover may be provided between the inflator and the airbag. The cover may be configured to secure the inflator to the panel assembly. The cover may be configured to couple the inflator to the airbag chute. The panel assembly may be configured to provide an airbag door for deployment of the airbag. The component may comprise at least one of (a) a trim component; (b) an instrument panel; (c) a door panel.

According to an exemplary embodiment as shown schematically in the FIGURES, a component for a vehicle interior configured for deployment of an airbag into the vehicle interior may comprise a panel comprising a structural substrate, a housing for the airbag coupled to the panel, and a cover configured to retain the airbag and the inflator to the housing. The housing may be configured to provide an airbag chute for deployment of the airbag. The airbag may be configured to be clamped between the cover and the housing. The airbag may comprise at least one flap coupled to the housing. The at least one flap may be coupled between the cover and the housing. The cover may be staked to the housing. The cover may comprise a molded plate. The component may comprise an inflator configured to inflate the airbag; the inflator may be assembled to the cover.

According to an exemplary embodiment as shown schematically in the FIGURES, a component for a vehicle interior configured for deployment of an airbag into the vehicle interior may be produced by a process comprising the steps of providing a panel assembly comprising a structural substrate and an airbag chute configured to facilitate deployment of the airbag, providing the airbag within the airbag chute, and assembling a cover plate to the panel assembly with the airbag. The cover plate and the panel assembly may be configured to provide a compartment for the airbag. The step of providing the airbag within the airbag chute may comprise coupling at least one flap of the airbag between the cover plate and the airbag chute. The step of assembling a cover plate to the panel assembly with the airbag may comprise staking the cover plate to the airbag chute to clamp the airbag between the cover plate and the airbag chute. The airbag may be enclosed by the cover plate. The process may comprise a step of securing an inflator to the cover plate.

According to an exemplary embodiment as shown schematically in the FIGURES, a component for a vehicle interior may comprise a panel, a structure on the panel providing a compartment, an airbag comprising a base section and a cushion configured to be inflated from the compartment for deployment through the panel into the vehicle interior, a cover for the compartment of the structure, and an inflator configured to inflate the cushion of the airbag for deployment into the vehicle interior. The airbag may be configured to be directly attached to the structure. The airbag may comprise a feature configured for attachment of the airbag to the structure; the feature may comprise a set of flanges comprising a set of holes.

Exemplary Embodiments—Method

According to an exemplary embodiment as shown schematically in FIG. 20A, a vehicle interior component may be produced by a process. See also FIGS. 17, 18A-18E and 19A-19B. The process may comprise providing a structural substrate (e.g. molding or forming a panel); providing a chute with a door (e.g. molding a chute with a living hinge); assembling the chute to the structural substrate (e.g. welding or bonding); providing an airbag (e.g. cutting and/or sewing fabric); providing a retainer (e.g. stamping a metal in a shape); assembling the retainer and the airbag with a fastener (e.g. a stud); placing the airbag with the retainer and fastener in the chute; closing the chute door; assembling an inflator to the door and the airbag (e.g. fastening a closure) and finishing/providing a panel assembly (with the airbag and the inflator).

According to an exemplary embodiment as shown schematically in FIG. 20B, a vehicle interior component may be produced by a process. See also FIGS. 17, 18A-18E and 19A-19B. The process may comprise providing a substrate/base; providing a housing with a flap; assembling the housing to the substrate/base; providing an airbag; providing a retainer; assembling the retainer and the airbag with a fastener; placing the airbag with the retainer and fastener in the housing; folding the flap; assembling an inflator to the flap and the airbag and finishing/providing a panel assembly (with the airbag and the inflator).

According to an exemplary embodiment as shown schematically in FIG. 20C, a vehicle interior component may be produced by a process. See also FIGS. 17, 18A-18E and 19A-19B. The process may comprise providing a structural substrate; providing a chute with a door; assembling the chute to the structural substrate; providing an airbag; providing a retainer; assembling the retainer and the airbag with a fastener; placing the airbag with the retainer and fastener in the chute; closing the chute door; assembling an inflator to the door and the airbag and finishing/providing a panel assembly (with the airbag and the inflator).

According to an exemplary embodiment as shown schematically in FIG. 21, a vehicle interior component may be produced by a process. See also FIGS. 17, 18A-18E and 19A-19B. The process may comprise providing a panel assembly (e.g. a structural substrate and chute with door); providing a chute with a door (e.g. molding a chute with a living hinge); assembling the chute to the structural substrate (e.g. welding or bonding); providing an airbag (e.g. cutting and/or sewing fabric); providing a retainer (e.g. stamping a metal in a shape); assembling the retainer and the airbag with a fastener (e.g. a stud); placing the airbag with the retainer and fastener in the chute; closing the chute door; assembling an inflator to the door and the airbag (e.g. fastening a closure) and finishing/providing a panel assembly (with the airbag and the inflator).

TABLE A

REFERENCE SYMBOL LIST

| ELEMENT, PART OR COMPONENT | REFERENCE SYMBOL |
|---|---|
| Vehicle | V |
| Interior | I |
| Instrument panel | IP |
| Door | D |
| Floor console | FC |
| Component | C |
| Airbag door | ABD |
| Airbag | AB |
| Panel assembly | P |
| Structural substrate | S |
| Retainer | R |
| Inflator | IN |
| Cover | CV |
| Fastener/Fastener Arrangement | F |
| Airbag chute | CH |
| Airbag/Airbag Assembly | AA |
| Door | CD |
| Closure | CS |
| Flap of airbag | FL |
| First door | CDA |
| Second door | CDB |
| Living hinge | LH |
| Panel assembly | CX |

TABLE A-continued

REFERENCE SYMBOL LIST

| ELEMENT, PART OR COMPONENT | REFERENCE SYMBOL |
|---|---|
| Substrate | SX |
| Housing | CHX |
| Airbag module | AMX |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior comprising:
a panel comprising a structure;
an airbag comprising a cushion configured for deployment through the panel into the vehicle interior;
a cover coupled to the structure;
wherein the airbag is coupled between the cover and the structure;
wherein the structure is configured to provide a compartment for the airbag;
wherein the airbag is configured for deployment from the compartment through the panel into the vehicle interior;
wherein the cover is configured to clamp the airbag between the cover and the structure.

2. The component of claim 1 wherein the airbag is configured for direct attachment to the structure.

3. The component of claim 1 wherein the airbag comprises a base section comprising a set of flaps configured for attachment of the airbag to the structure.

4. The component of claim 3 wherein the set of flaps comprises a set of holes for attachment of the airbag to the structure.

5. The component of claim 1 wherein the structure comprises a set of posts; wherein the airbag comprises a set of holes for attachment of the airbag to the structure.

6. The component of claim 5 wherein the airbag comprises a flap comprising the set of holes configured to engage the set of posts of the structure.

7. The component of claim 1 further comprising an inflator configured to inflate the cushion of the airbag for deployment into the vehicle interior; wherein the inflator is coupled to the cover.

8. The component of claim 1 wherein the cover comprises a molded cover plate.

9. The component of claim 1 wherein the airbag comprises at least one flap coupled between the cover and the structure.

10. The component of claim 1 further comprising an inflator configured to inflate the airbag; wherein the inflator is assembled to the cover.

11. The component of claim 1 wherein the cover comprises a set of features configured for attachment of the cover to the structure; wherein the set of features of the cover comprises a set of holes configured to engage a set of posts of the structure.

12. The component of claim 1 wherein the cover is staked to the structure.

13. The component of claim 1 wherein the structure comprises a frame configured for attachment of the airbag to the structure and attachment of a cover to the structure.

14. The component of claim 1 comprising at least one of (a) a trim component; (b) an instrument panel; (c) a door panel.

15. A component for a vehicle interior configured for deployment of an airbag into the vehicle interior produced by a process comprising the steps of:
providing a panel assembly comprising a structural substrate and an airbag chute configured to facilitate deployment of the airbag;
providing the airbag within the airbag chute;
assembling a cover plate to the panel assembly with the airbag;
wherein the cover plate and the panel assembly are configured to provide a compartment for the airbag;
wherein the step of providing the airbag within the airbag chute comprises clamping at least one flap of the airbag between the cover plate and the airbag chute.

16. The component of claim 15 wherein the step of assembling a cover plate to the panel assembly with the airbag comprises staking the cover plate to the airbag chute to clamp the airbag between the cover plate and the airbag chute.

17. The component of claim 15 wherein the airbag comprises an airbag component comprising (a) a base section comprising a set of flanges configured for attachment of the airbag to the airbag chute and (b) a cushion configured for deployment through the panel assembly into the vehicle interior.

18. The component of claim 17 wherein the set of flanges comprises a set of holes; wherein the airbag chute comprises a set of posts; wherein the set of flanges is configured to engage the set of posts of the structure.

19. A component for a vehicle interior comprising:
a panel;
a structure comprising a housing;
an airbag comprising a base section and a cushion configured for deployment through the panel into the vehicle interior;
a cover coupled to the structure;
wherein the airbag is coupled between the cover and the structure;
wherein the structure is configured to provide a compartment for the airbag;
wherein the airbag is configured for deployment from the compartment through the panel into the vehicle interior;
wherein the cover is configured to clamp the base section of the airbag between the cover and the structure.

20. The component of claim 19 wherein the base section of the airbag comprises a flap; wherein the cover is configured to clamp the flap of the base section of the airbag between the cover and the structure.

* * * * *